US012629718B2

(12) United States Patent
Shirono et al.

(10) Patent No.: US 12,629,718 B2
(45) Date of Patent: May 19, 2026

(54) FILM FORMING METHOD AND ARTICLE MANUFACTURING METHOD

(71) Applicant: CANON KABUSHIKI KAISHA, Tokyo (JP)

(72) Inventors: Jumpei Shirono, Kanagawa (JP); Toshiki Ito, Kanagawa (JP); Naoki Kiyohara, Richmond (GB)

(73) Assignee: CANON KABUSHIKI KAISHA, Tokyo (JP)

(*) Notice: Subject to any disclaimer, the term of this patent is extended or adjusted under 35 U.S.C. 154(b) by 163 days.

(21) Appl. No.: 18/740,735

(22) Filed: Jun. 12, 2024

(65) Prior Publication Data

US 2024/0326091 A1 Oct. 3, 2024

Related U.S. Application Data

(63) Continuation of application No. PCT/JP2022/040365, filed on Oct. 28, 2022.

(30) Foreign Application Priority Data

Dec. 17, 2021 (JP) ................................ 2021-205461

(51) Int. Cl.

*B05D 3/10* (2006.01)
*B05D 1/02* (2006.01)
*B05D 3/04* (2006.01)

(52) U.S. Cl.

CPC ............... *B05D 3/108* (2013.01); *B05D 1/02* (2013.01); *B05D 3/0413* (2013.01); *B05D 2401/10* (2013.01)

(58) Field of Classification Search

CPC ........ B05D 3/108; B05D 1/02; B05D 3/0413; B05D 2401/10

See application file for complete search history.

(56) References Cited

U.S. PATENT DOCUMENTS

2009/0267268 A1 10/2009 Yoneda et al.
2019/0250505 A1 8/2019 LaBrake et al.
(Continued)

FOREIGN PATENT DOCUMENTS

JP 2006167650 A 6/2006
JP 2007000867 A 1/2007
(Continued)

OTHER PUBLICATIONS

JP-6354171-B2 English translation (Year: 2018).*
(Continued)

*Primary Examiner* — Hai Y Zhang

(74) *Attorney, Agent, or Firm* — ROSSI, KIMMS & McDOWELL LLP

(57) ABSTRACT

The present invention provides a film forming method comprising: discretely arranging, on a substrate with unevenness, a plurality of droplets of a curable composition in a liquid form containing at least a polymerizable compound (a) as a nonvolatile component and at least a solvent (d) as a volatile component; waiting until each of the plurality of droplets discretely arranged on the substrate combines with an adjacent droplet to form a continuous liquid film on the substrate, and the solvent (d) contained in the liquid film volatilizes, and a content of the solvent (d) becomes not more than 10 vol % with respect to the whole liquid film; and curing the curable composition in the liquid form after the waiting.

12 Claims, 9 Drawing Sheets

(56) References Cited

U.S. PATENT DOCUMENTS

| | | | |
|---|---|---|---|
| 2019/0393026 | A1 | 12/2019 | Kato et al. |
| 2020/0286740 | A1 | 9/2020 | De Young et al. |

FOREIGN PATENT DOCUMENTS

| | | | |
|---|---|---|---|
| JP | 2008531766 | A | 8/2008 |
| JP | 2009503139 | A | 1/2009 |
| JP | 2009088376 | A | 4/2009 |
| JP | 2015136635 | A | 7/2015 |
| JP | 6354171 | B2 * | 7/2018 |
| JP | 2019140394 | A | 8/2019 |
| TW | I667117 | B | 8/2019 |
| TW | I681862 | B | 1/2020 |
| WO | 2006098575 | A1 | 9/2006 |
| WO | 2007050133 | A2 | 5/2007 |
| WO | 2013154075 | A1 | 10/2013 |
| WO | 2020059604 | A1 | 3/2020 |

OTHER PUBLICATIONS

Oron et al. "Long-scale evolution of thin liquid films". Review of Modern Physics. 1997: 931-980. vol. 69, No. 3. Cited in Specification.

Okabe. "Advanced materials to enhance the productivity of Nanoimprint lithography". SPIE—Advanced Lithography 2020. 19 pages. Cited in Specification.

International Search Report issued in Intl. Appln. No. PCT/JP2022/040365 mailed Jan. 17, 2023. English translation provided.

Written Opinion issued in Intl. Appln. No. PCT/JP2022/040365 mailed Jan. 17, 2023.

* cited by examiner

FILM FORMING METHOD AND ARTICLE MANUFACTURING METHOD

CROSS-REFERENCE TO RELATED APPLICATIONS

This application is a Continuation of International Patent Application No. PCT/JP2022/040365, filed Oct. 28, 2022, which claims the benefit of Japanese Patent Application No. 2021-205461, filed Dec. 17, 2021, both of which are hereby incorporated by reference herein in their entirety.

BACKGROUND OF THE INVENTION

Field of the Invention

The present invention relates to a film forming method and an article manufacturing method.

Background Art

A photolithography step of fabricating a semiconductor device requires planarization of a substrate. For example, in an extreme ultraviolet exposure technique (EUV) as a photolithography technique attracting attention in recent years, the depth of focus at which a projected image is formed decreases as miniaturization advances, so the unevenness on the surface of a substrate to which a curable composition is supplied must be decreased to a few tens nm or less. Flatness equivalent to that of EUV is required in an imprint technique as well, in order to improve the filling properties of a curable composition and the line width accuracy (see NPL 1). As a planarization technique, there is known a technique of obtaining a flat surface by discretely dropping, on an uneven substrate, droplets of a curable composition in an amount corresponding to the unevenness, and curing the curable composition in a state in which a mold having a flat surface is in contact with the curable composition (see PTLs 1 and 2).

However, in the conventional planarization technique shown in PTLs 1 and 2, since the mold is brought into contact in a state in which the droplets dropped onto the substrate are not in contact with each other, bubbles are entrapped between the mold, the substrate, and the curable composition. Hence, a long time is needed until the bubbles are diffused to the mold or the substrate and disappear, and this is one of factors for lowering productivity (throughput).

CITATION LIST

Patent Literature

PTL 1: Japanese Patent Laid-Open No. 2019-140394
PTL 2: US-2020-0286740
PTL 3: Japanese Patent Laid-Open No. 2009-503139

Non Patent Literature

NPL 1: Proc. SPIE 11324-11 (2020)
NPL 2: A. Oron, S. H. Davis, S. G. Bankoff, "Long-scale evolution of thin liquid films", Review of Modern Physics 69 (1997) 931

SUMMARY OF THE INVENTION

The present invention provides, for example, a technique advantageous in performing planarization of a substrate with high productivity.

According to one aspect of the present invention, there is provided a film forming method comprising: discretely arranging, on a substrate with unevenness, a plurality of droplets of a curable composition in a liquid form containing at least a polymerizable compound (a) as a nonvolatile component and at least a solvent (d) as a volatile component; waiting until each of the plurality of droplets discretely arranged on the substrate combines with an adjacent droplet to form a continuous liquid film on the substrate, and the solvent (d) contained in the liquid film volatilizes, and a content of the solvent (d) becomes not more than 10 vol % with respect to the whole liquid film; and curing the curable composition in the liquid form after the waiting, wherein the substrate includes a plurality of regions having different average heights, in the arranging, the curable composition is arranged such that an average liquid film thickness of the curable composition arranged in a certain region is larger by an offset amount than the average liquid film thickness of the curable composition arranged in a most projecting part region of the substrate, and the offset amount is determined in accordance with the content of the solvent (d) that volatizes in the waiting, and a curing shrinkage rate of the curable composition.

Further features of the present invention will become apparent from the following description of exemplary embodiments with reference to the attached drawings.

DESCRIPTION OF THE EMBODIMENTS

Figure 1A:
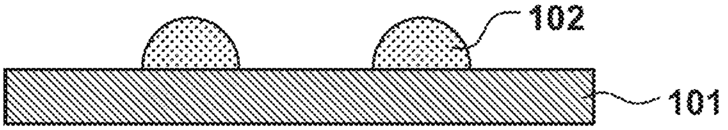
FIGS. 1A to 1F are views showing a film forming method according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The present inventors provide a new technique concerning a flat film forming method. The present inventors found process conditions and a curable composition with which a flat film can be formed after droplets of the curable composition discretely dropped (arranged) on a substrate combine with each other, a solvent in the curable composition volatilizes, and a nonvolatile component of the curable composition remaining on the substrate is cured.

[Curable Composition]

A curable composition (A) according to the present invention is a composition containing at least a component (a) as a polymerizable compound. The curable composition (A) according to the present invention may further contain a component (b) as a polymerization initiator, a nonpolymerizable compound (c), and a component (d) as a solvent. The components (a) to (c) can be nonvolatile components, and the component (d) can be a volatile component. In this specification, a cured film means a film cured by polymerizing the curable composition on a substrate. By the present invention, a flat cured film is provided.

<Component (a): Polymerizable Compound>

The component (a) is a polymerizable compound. In this specification, the polymerizable compound is a compound that reacts with a polymerizing factor (for example, a radical) generated from a polymerization initiator (the component (b)), and forms a film made of a polymer compound by a chain reaction (polymerization reaction). A compound that spontaneously generates a polymerization factor by heating and polymerizes can also be used as the component (a).

An example of the polymerizable compound as described above is a radical polymerizable compound. The polymerizable compound as the component (a) can be formed by only one type of a polymerizable compound, and can also be formed by a plurality of types of polymerizable compounds.

Examples of the radical polymerizable compound are a (meth)acrylic compound, a styrene-based compound, a vinyl-based compound, an allylic compound, a fumaric compound, and a maleic compound.

The (meth)acrylic compound is a compound having one or more acryloyl groups or methacryloyl groups. Examples of a monofunctional (meth)acrylic compound having one acryloyl group or methacryloyl group are as follows, but the compound is not limited to these examples.

Phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of EO-modified p-cumylphenol, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylenenonylphenylether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth) acrylate, 4-butylcyclohexyl(meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth) acrylate, benzyl (meth)acrylate, tetrahydrofurfuryl (meth) acrylate, butoxyethyl (meth)acrylate, ethoxydiethyleneglycol (meth)acrylate, polyethyleneglycol mono(meth)acrylate, polypropyleneglycol mono(meth)acrylate, methoxyethyleneglycol (meth)acrylate, ethoxyethyl (meth)acrylate, methoxypolyethyleneglycol (meth)acrylate, methoxypolypropyleneglycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, 1- or 2-naphthyl (meth)acrylate, 1- or 2-naphthylmethyl (meth)acrylate, 3- or 4-phenoxybenzyl (meth)acrylate, and cyanobenzyl (meth)acrylate.

Examples of commercially available products of the above-described monofunctional (meth)acrylic compounds are as follows, but the products are not limited to these examples.

ARONIX® M101, M102, M110, M111, M113, M117, M5700, TO-1317, M120, M150, and M156 (manufactured by TOAGOSEI); MEDOL10, MIBDOL10, CHDOL10, MMDOL30, MEDOL30, MIBDOL30, CHDOL30, LA, IBXA, 2-MTA, HPA, and Viscoat #150, #155, #158, #190, #192, #193, #220, #2000, #2100, and #2150 (manufactured by OSAKA ORGANIC CHEMICAL INDUSTRY); Light Acrylate BO-A, EC-A, DMP-A, THF-A, HOP-A, HOA-MPE, HOA-MPL, PO-A, P-200A, NP-4EA, NP-8EA, Epoxy Ester M-600A, POB-A, and OPP-EA (manufactured by KYOEISHA CHEMICAL); KAYARAD® TC110S, R-564, and R-128H (manufactured by NIPPON KAYAKU); NK Ester AMP-10G, AMP-20G, and A-LEN-10 (manufactured by SHIN-NAKAMURA CHEMICAL); FA-511A, 512A, and 513A (manufactured by Hitachi Chemical); PHE, CEA, PHE-2, PHE-4, BR-31, BR-31M, and BR-32 (manufactured by DKS); VP (manufactured by BASF); and ACMO, DMAA, and DMAPAA (manufactured by Kohjin).

Examples of a polyfunctional (meth)acrylic compound having two or more acryloyl groups or methacryloyl groups are as follows, but the compound is not limited to these examples.

Trimethylolpropane di(meth)acrylate, trimethylolpropane tri(meth)acrylate, EO-modified trimethylolpropane tri (meth)acrylate, PO-modified trimethylolpropane tri(meth) acrylate, EO- and PO-modified trimethylolpropane tri(meth) acrylate, dimethylol tricyclodecane di(meth)acrylate, pentaerythritol tri(meth)acrylate, pentaerythritol tetra(meth) acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, 1,3-adamantanedimethanol di(meth)acrylate, tris(2-hydoxyethyl)isocyanurate tri(meth)acrylate, tris(acryloyloxy)isocyanurate, bis(hydroxymethyl)tricyclodecane di(meth)acrylate, dipentaerythritol penta(meth)acrylate, dipentaerythritol hexa(meth)acrylate, EO-modified 2,2-bis(4-((meth)acryloxy)phenyl) propane, PO-modified 2,2-bis(4-((meth)acryloxy)phenyl) propane, EO- and PO-modified 2,2-bis(4-((meth)acryloxy) phenyl)propane, o-, m-, or p-benzene di(meth)acrylate, and o-, m-, or p-xylylene di(meth)acrylate.

Examples of commercially available products of the above-described polyfunctional (meth)acrylic compounds are as follows, but the products are not limited to these examples.

Yupimer® UV SA1002 and SA2007 (manufactured by Mitsubishi Chemical); Viscoat #195, #230, #215, #260, #335HP, #295, #300, #360, #700, GPT, and 3PA (manufactured by OSAKA ORGANIC CHEMICAL INDUSTRY); Light Acrylate 4EG-A, 9EG-A, NP-A, DCP-A, BP-4EA, BP-4PA, TMP-A, PE-3A, PE-4A, and DPE-6A (manufactured by KYOEISHA CHEMICAL); KAYARAD® PET-30, TMPTA, R-604, DPHA, DPCA-20, -30, -60, and -120, HX-620, D-310, and D-330 (manufactured by NIPPON KAYAKU); ARONIX® M208, M210, M215, M220, M240, M305, M309, M310, M315, M325, and M400 (manufactured by TOAGOSEI); Ripoxy® VR-77, VR-60, and VR-90 (manufactured by Showa Highpolymer); and OGSOL EA-0200 and OGSOL EA-0300 (manufactured by Osaka Gas Chemicals).

Note that in the above-described compound county, (meth)acrylate means acrylate or methacrylate having an alcohol residue equal to acrylate. A (meth)acryloyl group means an acryloyl group or a methacryloyl group having an alcohol residue equal to the acryloyl group. EO indicates ethylene oxide, and an EO-modified compound A indicates a compound in which a (meth)acrylic acid residue and an alcohol residue of a compound A bond via the block structure of an ethylene oxide group. Also, PO indicates a propylene oxide, and a PO-modified compound B indicates a compound in which a (meth)acrylic acid residue and an alcohol residue of a compound B bond via the block structure of a propylene oxide group.

Practical examples of the styrene-based compound are as follows, but the compound is not limited to these examples. Alkylstyrene such as styrene, 2,4-dimethyl-a-methylstyrene, o-methylstyrene, m-methylstyrene, p-methylstyrene, 2,4-dimethylstyrene, 2,5-dimethylstyrene, 2,6-dimethylstyrene, 3,4-dimethylstyrene, 3,5-dimethylstyrene, 2,4,6-trimethylstyrene, 2,4,5-trimethylstyrene, pentamethylstyrene, o-ethylstyrene, m-ethylstyrene, p-ethylstyrene, diethylstyrene, triethylstyrene, propylstyrene 2,4-diisopropylstyrene, butylstyrene, hexylstyrene, heptylstyrene, and octylstyrene; styrene halide such as fluorostyrene, o-chlorostyrene, m-chlorostyrene, p-chlorostyrene, o-bromostyrene, m-bromostyrene, p-bromostyrene, dibromostyrene, and iodostyrene; and a compound having a styryl group as a polymerizable functional group, such as nitrostyrene, acetylstyrene, o-methoxystyrene, m-methoxystyrene, p-methoxystyrene, o-hydroxystyrene, m-hydroxystyrene, p-hydroxystyrene, 2-vinylbiphenyl, 3-vinylbiphenyl, 4-vinylbiphenyl, 1-vinylnaphthalene, 2-vinylnaphthalene, 4-vinyl-p-terphenyl, 1-vinylanthracene, α-methylstyrene, o-isopropenyltoluene, m-isopropenyltoluene, p-isopropenyltoluene, 2,3-dimethyl-α-methylstyrene, 3,5-dimethyl-α-methylstyrene, p-isopropyl-α-methylstyrene, α-ethylstyrene, α-chlorostyrene, divinylbenzene, diisopropylbenzene, and divinylbiphenyl.

Practical examples of the vinyl-based compound are as follows, but the compound is not limited to these examples.

Vinylpyridine, vinylpyrrolidone, vinylcarbazole, vinyl acetate, and acrylonitrile; conjugated diene monomers such as butadiene, isoprene, and chloroprene; vinyl halide such as vinyl chloride and vinyl bromide; a compound having a vinyl group as a polymerizable functional group, for example, vinylidene halide such as vinylidene chloride, vinyl ester of organic carboxylic acid and its derivative (for example, vinyl acetate, vinyl propionate, vinyl butyrate, vinyl benzoate, and divinyl adipate), and (meth)acrylonitrile.

Note that in this specification, (meth)acrylonitrile is a general term for acrylonitrile and methacrylonitrile.

Examples of the allylic compound are as follows, but the compound is not limited to these examples.

Allyl acetate, allyl benzoate, diallyl adipate, diallyl terephthalate, diallyl isophthalate, and diallyl phthalate.

Examples of the fumaric compound are as follows, but the compound is not limited to these examples.

Dimethyl fumarate, diethyl fumarate, diisopropyl fumarate, di-sec-butyl fumarate, diisobutyl fumarate, di-n-butyl fumarate, di-2-ethylhexyl fumarate, and dibenzyl fumarate.

Examples of the maleic compound are as follows, but the compound is not limited to these examples.

Dimethyl maleate, diethyl maleate, diisopropyl maleate, di-sec-butyl maleate, diisobutyl maleate, di-n-butyl maleate, di-2-ethylhexyl maleate, and dibenzyl maleate.

Other examples of the radical polymerizable compound are as follows, but the compound is not limited to these examples.

Dialkylester of itaconic acid and its derivative (for example, dimethyl itaconate, diethyl itaconate, diisopropyl itaconate, di-sec-butyl itaconate, diisobutyl itaconate, di-n-butyl itaconate, di-2-ethylhexyl itaconate, and dibenzyl itaconate), an N-vinylamide derivative of organic carboxylic acid (for example, N-methyl-N-vinylacetamide), and maleimide and its derivative (for example, N-phenylmaleimide and N-cyclohexylmaleimide).

If the component (a) is formed by a plurality of types of compounds having one or more polymerizable functional groups, a monofunctional compound and a polyfunctional compound are preferably included. This is because if a monofunctional compound and a polyfunctional compound are combined, a cured film having well-balanced performance, for example, a high mechanical strength, a high dry etching resistance, and a high heat resistance can be obtained.

The film forming method of the present invention requires a few milliseconds to a few hundreds of seconds until droplets of the curable composition (A) discretely arranged on a substrate combine with each other and form a practically continuous liquid film, so a waiting step (to be described later) is necessary. In this waiting step, the solvent (d) is volatilized, but the polymerizable compound (a) is not volatilized. Accordingly, in the polymerizable compound (a) that can contain a plurality of types of compounds, the boiling points of all the compounds at normal pressure are preferably 250° C. or more, more preferably 300° C. or more, and further preferably 350° C. or more. Also, to obtain a high dry etching resistance and a high heat resistance, the cured film of the curable composition (A) preferably contains at least a compound having a cyclic structure such as an aromatic structure, an aromatic heterocyclic structure, or an alicyclic structure.

The boiling point of the polymerizable compound (a) is almost correlated with the molecular weight. Therefore, the molecular weights of all the polymerizable compounds (a) are preferably 200 or more, more preferably 240 or more, and further preferably 250 or more. However, even when the molecular weight is 200 or less, the compound is preferably usable as the polymerizable compound (a) of the present invention if the boiling point is 250° C. or more.

In addition, the vapor pressure at 80° C. of the polymerizable compound (a) is preferably 0.001 mmHg or less. This is so because, although it is favorable to heat the curable composition when accelerating volatilization of the solvent (d) (to be described later), it is necessary to suppress volatilization of the polymerizable compound (a) during heating.

Note that the boiling point and the vapor pressure of each organic compound at normal pressure can be calculated by, for example, Hansen Solubility Parameters in Practice (HSPiP) 5th Edition. 5.3.04.

The carbon number of the aromatic structure is preferably 6 to 22, more preferably 6 to 18, and further preferably 6 to 10. Practical examples of the aromatic ring are as follows.

A benzene ring, a naphthalene ring, an anthracene ring, a phenanthrene ring, a phenalene ring, a fluorene ring, a benzocyclooctene ring, an acenaphthylene ring, a biphenylene ring, an indene ring, an indane ring, a triphenylene ring, a pyrene ring, a chrysene ring, a perylene ring, and a tetrahydronaphthalene ring.

Note that, of the above-described aromatic rings, a benzene ring or a naphthalene ring is preferable, and a benzene ring is more preferable. The aromatic ring can have a structure in which a plurality of rings are connected. Examples are a biphenyl ring and a bisphenyl ring.

The carbon number of the aromatic heterocyclic structure is preferably 1 to 12, more preferably 1 to 6, and further preferably 1 to 5. Practical examples of the aromatic heterocycle are as follows.

A thiophene ring, a furan ring, a pyrolle ring, an imidazole ring, a pyrazole ring, a triazole ring, a tetrazole ring, a thiazole ring, a thiadiazole ring, an oxadiazole ring, an oxazole ring, a pyridine ring, a pyrazine ring, a pyrimidine ring, pyridazine ring, an isoindole ring, an indole ring, an indazole ring, a purine ring, a quinolizine ring, an isoquinoline ring, a quinoline ring, a phthalazine ring, a naphthyridine ring, a quinoxaline ring, a quinazoline ring, a cinnoline ring, a carbazole ring, an acridine ring, a phenazine ring, a phenothiazine ring, a phenoxathiine ring, and a phenoxazine ring.

The carbon number of the alicyclic structure is preferably 3 or more, more preferably 4 or more, and further preferably 6 or more. In addition, the carbon number of the alicyclic structure is preferably 22 or less, more preferably 18 or less, further preferably 6 or less, and still further preferably 5 or less. Practical examples are as follows.

A cyclopropane ring, a cyclobutane ring, a cyclobutene ring, a cyclopentane ring, a cyclohexane ring, a cyclohexene ring, a cycloheptane ring, a cyclooctane ring, a dicyclopentadiene ring, a spirodecane ring, a spirononane ring, a tetrahydro dicyclopentadiene ring, an octahydronaphthalene ring, a decahydronaphthalene ring, a hexahydroindane ring, a bornane ring, a norbornane ring, a norbornene ring, an isobornane ring, a tricyclodecane ring, a tetracyclododecane ring, and an adamantane ring.

Practical examples of the polymerizable compound (a) having a cyclic structure and a boiling point of 250° C. or more are as follows, but the compound is not limited to these examples.

- dicyclopentanyl acrylate (boiling point=262° C., molecular weight=206)
- dicyclopentenyl acrylate (boiling point=270° C., molecular weight=204)
- 1,3-cyclohexanedimethanol diacrylate (boiling point=310° C., molecular weight=252)
- 1,4-cyclohexanedimethanol diacrylate (boiling point=339° C., molecular weight=252)
- 4-hexylresolsinol diacrylate (boiling point=379° C., molecular weight=302)
- 6-phenylhexane-1,2-diol diacrylate (boiling point=381° C., molecular weight=302)
- 7-phenylheptan-1,2-diol diacrylate (boiling point=393° C., molecular weight=316)
- 1,3-bis((2-hydroxyethoxy)methyl)cyclohexane diacrylate (boiling point=403° C., molecular weight=340)
- 8-phenyloctane-1,2-diol diacrylate (boiling point=404° C., molecular weight=330)
- 1,3-bis((2-hydroxyethoxy)methyl)benzene diacrylate (boiling point=408° C., molecular weight=334)
- 1,4-bis((2-hydroxyethoxy)methyl)cyclohexane diacrylate (boiling point=445° C., molecular weight=340)
- 3-phenoxybenzyl acrylate (mPhOBzA, OP=2.54, boiling point=367.4° C., 80° C. vapor pressure=0.0004 mmHg, molecular weight=254.3)

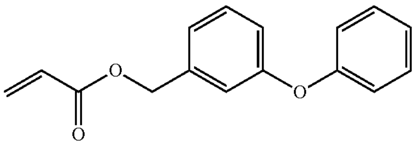 [SMILES: C=CC(=O)OCc1cccc(Oc2ccccc2)c1]

- 1-naphthyl acrylate (NaA, OP=2.27, boiling point=317° C., 80° C. vapor pressure=0.0422 mmHg, molecular weight=198)

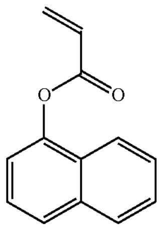

- 2-phenylphenoxyethyl acrylate (PhPhOEA, OP=2.57, boiling point=364.2° C., 80° C. vapor pressure=0.0006 mmHg, molecular weight=268.3)

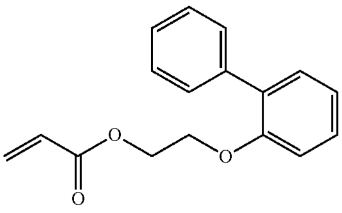 [SMILES: C=CC(=O)OCCOc1ccccc1-c1ccccc1]

- 1-naphthylmethyl acrylate (Na1MA, OP=2.33, boiling point=342.1° C., 80° C. vapor pressure=0.042 mmHg, molecular weight=212.2)

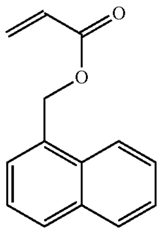 [SMILES: C=CC(=O)OCc1cccc2ccccc12]

- 2-naphthylmethyl acrylate (Na2MA, OP=2.33, boiling point=342.1° C., 80° C. vapor pressure=0.042 mmHg, molecular weight=212.2)

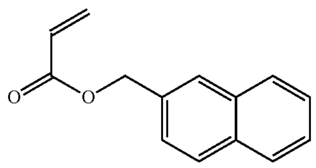 [SMILES: C=CC(=O)OCc1ccc2ccccc2c1]

4-cyanobenzyl acrylate (CNBzA, OP=2.44, boiling point=316° C., molecular weight=187)

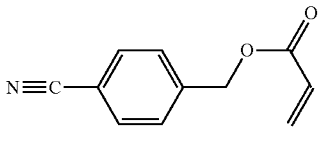

DVBzA indicated by the formula below (OP=2.50, boiling point=304.6° C., 80° C. vapor pressure=0.0848 mmHg, molecular weight=214.3)

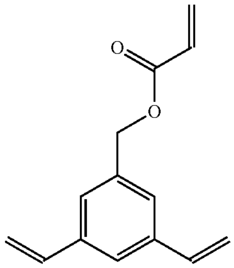 [SMILES: C=CC(=O)OCc1cc(C=C)cc(C=C)c1]

DPhPA indicated by the formula below (OP=2.38, boiling point=354.5° C., 80° C. vapor pressure 0.00022 mmHg, molecular weight=266.3)

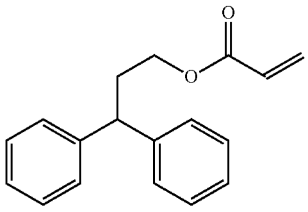 [SMILES: C=CC(=O)OCCC(c1ccccc1)c1ccccc1]

PhBzA indicated by the formula below (OP=2.29, boiling point=350.4° C., 80° C. vapor pressure=0.0022 mmHg, molecular weight=238.3)

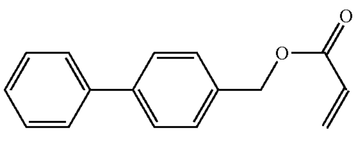 [SMILES: C=CC(=O)OCc1ccc(-c2ccccc2)cc1]

FLMA indicated by the formula below (OP=2.20, boiling point=349.3° C., 80° C.

vapor pressure=0.0018 mmHg, molecular weight=250.3)

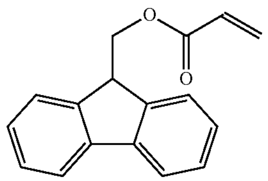 [SMILES: C=CC(=O)OCC1c2ccccc2-c2ccccc21]

ATMA indicated by the formula below (OP=2.13, boiling point=414.9° C., 80° C. vapor pressure=0.0001 mmHg, molecular weight=262.3)

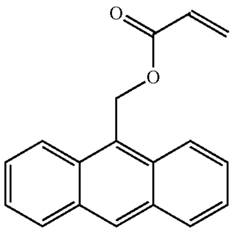 [SMILES: C=CC(=O)OCc1c2ccccc2cc2ccccc12]

DNaMA indicated by the formula below (OP=2.00, boiling point=489.4° C., 80° C. vapor pressure<0.0001 mmHg, molecular weight=338.4)

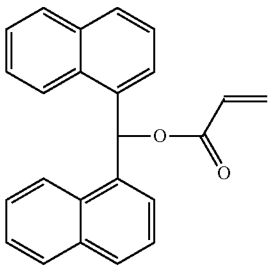 [SMILES: C=CC(=O)OC(c1cccc2ccccc12)c1cccc2ccccc12]

tricyclodecanedimethanol diacrylate (DCPDA, OP=3.29, boiling point=342° C., 80° C. vapor pressure<0.0024 mmHg, molecular weight=304)

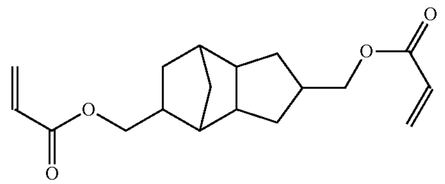 [SMILES: C=CC(=O)OCC1CC2C3CC(COC(=O)C=C)C(C3)C2C1]

m-xylylene diacrylate (mXDA OP=3.20, boiling point=336° C., 80° C. vapor pressure<0.0043 mmHg, molecular weight=246)

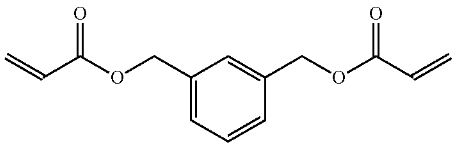 [SMILES: C=CC(=O)OCc1cccc(COC(=O)C=C)c1]

1-phenylethane-1,2-diyl diacrylate (PhEDA, OP=3.20, 80° C. vapor pressure<0.0057 mmHg, boiling point=354° C., molecular weight=246)

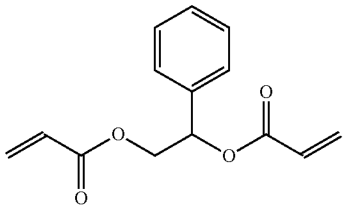 [SMILES: C=CC(=O)OCC(OC(=O)C=C)c1ccccc1]

2-phenyl-1,3-propan diol diacrylate (PhPDA, OP=3.18, boiling point=340° C., 80° C. vapor pressure<0.0017 mmHg, molecular weight=260)

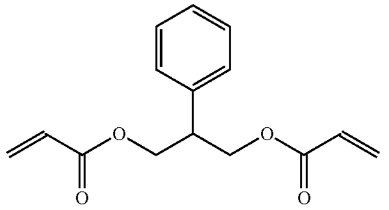 [SMILES: C=CC(=O)OCC(COC(=O)C=C)c1ccccc1]

VmXDA indicated by the formula below (OP=3.00, boiling point=372.4° C., 80° C. vapor pressure=0.0005 mmHg, molecular weight=272.3)

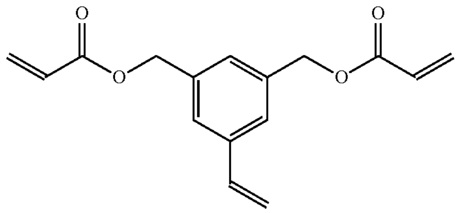 [SMILES: C=CC(=O)OCc1cc(C=C)cc(COC(=O)C=C)c1]

BPh44DA indicated by the formula below (OP=2.63, boiling point=444° C., 80° C. vapor pressure<0.0001 mmHg, molecular weight=322.3)

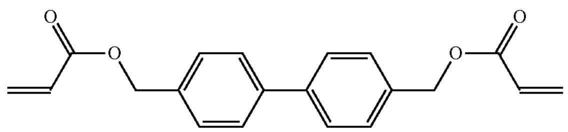 [SMILES: C=CC(=O)OCc1ccc(-c2ccc(COC(=O)C=C)cc2)cc1]

BPh43DA indicated by the formula below (OP=2.63, boiling point=439.5° C., 80° C. vapor pressure<0.0001 mmHg, molecular weight=322.3)

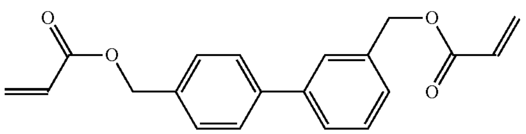 [SMILES: C=CC(=O)OCc1ccc(-c2cccc(COC(=O)C=C)c2)cc1]

DPhEDA indicated by the formula below (OP=2.63, boiling point=410° C., 80° C. vapor pressure<0.0001 mm Hg, molecular weight=322.3)

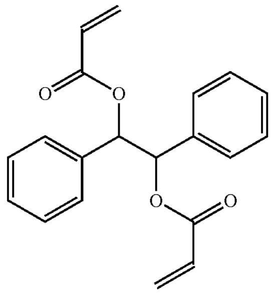 [SMILES: C=CC(=O)OC(c1ccccc1)C(OC(=O)C=C)c1ccccc1]

BPMDA indicated by the formula below (OP=2.68, boiling point=465.7° C., 80° C. vapor pressure K 0.0001 mmHg, molecular weight=364.4)

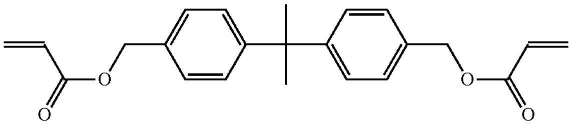 [SMILES: C=CC(=O)OCc1ccc(C(C)(C)c2ccc(COC(=O)C=C)cc2)cc1]

Na13MDA indicated by the formula below (OP=2.71, boiling point=438.8° C., 80° C. vapor pressure<0.0001 mmHg, molecular weight=296.3)

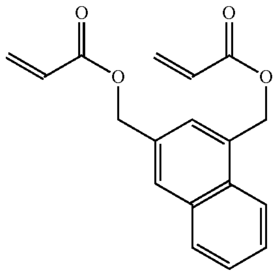 [SMILES: C=CC(=O)OCc1cc(COC(=O)C=C)c2ccccc2c1]

The blending ratio of the component (a) in the curable composition (A) is preferably 40 wt % or more and 99 wt % or less with respect to the sum of the component (a), a component (b) (to be described later), and a component (c) (to be described later), that is, the total mass of all the components except the solvent (d). The blending ratio is more preferably 50 wt % or more and 95 wt % or less, and further preferably 60 wt % or more and 90 wt % or less. When the blending ratio of the component (a) is 40 wt % or more, the mechanical strength of the cured film of the curable composition increases. Also, when the blending ratio of the component (a) is 99 wt % or less, it is possible to increase the blending ratios of the components (b) and (c), and obtain characteristics such as a high photopolymerization rate.

At least a part of the component (a) of the present invention, which may include a plurality of types of additive components, can be polymers having a polymerizable functional group. The polymer preferably contains at least a cyclic structure such as an aromatic structure, an aromatic heterocyclic structure, or an alicyclic structure. For example, the polymer preferably contains at least one of constituent units represented by formulas (1) to (6) below:

(1)

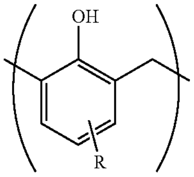

(2)

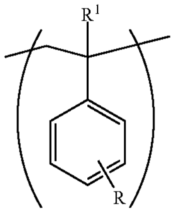

(3)

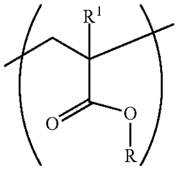

(4)

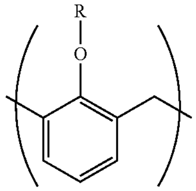

(5)

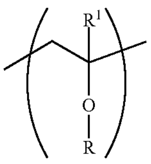

(6)

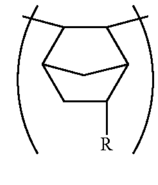

In the formulas (1) to (6), a substituent group R is a substituent group containing partial structures each independently containing an aromatic ring, and R1 is a hydrogen atom or a methyl group. In this specification, in constituent units represented by the formulas (1) to (6), a portion other than R is the main chain of a specific polymer. The formula weight of the substituent group R is 80 or more, preferably 100 or more, more preferably 130 or more, and further preferably 150 or more. The upper limit of the formula weight of the substituent group R is practically 500 or less.

A polymer having a polymerizable functional group is normally a compound having a weight-average molecular weight of 500 or more. The weight-average molecular weight is preferably 1,000 or more, and more preferably 2,000 or more. The upper limit of the weight-average molecular weight is not particularly determined, but is preferably, for example, 50,000 or less. When the weight-average molecular weight is set at the above-described lower limit or more, it is possible to set the boiling point at 250° C. or more, and further improve the mechanical properties after curing. Also, when the weight-average molecular weight is set at the above-described upper limit or less, the solubility to the solvent increases, and the flowability of discretely arranged droplets is maintained because the viscosity is not too high. This makes it possible to further improve the flatness of the liquid film surface. Note that the weight-average molecular weight (Mw) in the present invention is a molecular weight measured by gel permeation chromatography (GPC).

Practical examples of the polymerizable functional group of the polymer are a (meth)acryloyl group, a vinyl group, an epoxy group, an oxetane group, a methylol group, a methylol ether group, and a vinyl ether group. A (meth)acryloyl group is particularly favorable from the viewpoint of polymerization easiness.

When adding the polymer having the polymerizable functional group as at least a part of the component (a), the blending ratio can freely be set as long as the blending ratio falls within the range of the viscosity regulation to be described later. For example, the blending ratio to the total mass of all the components except for the solvent (d) is preferably 0.1 wt % or more and 60 wt % or less, more preferably 1 wt % or more and 50 wt % or less, and further preferably 10 wt % or more and 40 wt % or less. When the blending ratio of the polymer having the polymerizable functional group is set at 0.1 wt % or more, it is possible to improve the heat resistance, the dry etching resistance, the mechanical strength, the low curing shrinkage, and the low volatility. Also, when the blending ratio of the polymer having the polymerizable functional group is set at 60 wt % or less, it is possible to make the blending ratio fall within the range of the upper limit regulation of the viscosity (to be described later).

<Component (b): Polymerization Initiator>

The component (b) is a polymerization initiator. The polymerization initiator may be a photopolymerization initiator or a thermal polymerization initiator. In this specification, the photopolymerization initiator is a compound that senses light having a predetermined wavelength and generates a polymerization factor (radical) described earlier. More specifically, the photopolymerization initiator is a polymerization initiator (radical generator) that generates a radical by light (infrared light, visible light, ultraviolet light, far-ultraviolet light, X-ray, a charged particle beam such as an electron beam, or radiation). The thermal polymerization initiator is a polymerization initiator (radical generator) that generates a radical by heating. The component (b) can be formed by only one type of a polymerization initiator, and can also be formed by a plurality of types of polymerization initiators.

Examples of the photopolymerization initiator are as follows, but the photopolymerization initiator is not limited to these examples.

2,4,5-triarylimidazole dimers that can have substituent groups, such as a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, and a 2-(o- or p-methoxyphenyl)-4,5-diphenylimidazole dimer; benzophenone derivatives such as benzophenone, N,N'-tetramethyl-4,4'-diaminobenzophenone (Michiler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone; α-amino aromatic ketone derivatives such as 2-benzyl-2-dimethylamino-1-(4-morpholinophenyl)-butanone-1,2-methyl-1-[4-(methylthio)phenyl]-2-morpholino-propane-1-one; quinones such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphtoquinone, 9,10-phenanthraquinone, 2-methyl-1,4-naphtoquinone, and 2,3-dimethylanthraquinone; benzoin ether derivatives such as benzoin methyl ether, benzoin ethyl ether, and benzoin phenyl ether; benzoin derivatives such as benzoin, methyl benzoin, ethyl benzoin, and propyl benzoin; benzyl derivatives such as benzyldimethylketal; acridine derivatives such as 9-phenylacridine and 1,7-bis(9,9'-acrydinyl)heptane; N-phenylglycine derivatives such as N-phenylglycine; acetophenone derivatives such as acetophenone, 3-methylacetophenone, acetophenone benzylketal, 1-hydroxycylohexyl phenylketone, and 2,2-dimethoxy-2-phenyl acetophenone; thioxanthone derivatives such as thioxanthone, diethylthioxanthone, 2-isopropylthioxanthone, and 2-chlorothioxanthone; acylphosphine oxide derivatives such as 2,4,6-trimethylbenzoyldiphenylphosphine oxide, bis(2,4,6-trimethylbenzoyl)phenylphosphine oxide, and bis-(2,6-dimethoxybenzoyl)-2,4,4-trimethylpentylphosphine oxide; oxime ester derivatives such as 1,2-octanedione, 1-[4-(phenylthiol)-,2-(O-benzoyloxime)], ethanone, 1-[9-ethyl-6-(2-methylbenzoyl)-9H-carbazole-3-yl]-, and 1-(0-acetyloxime); and xanthone, fluorenone, benzaldehyde, fluorene, anthraquinone, triphenylamine, carbazole, 1-(4-isopropylphenyl)-2-hydroxy-2-methylprapane-1-one, and 2-hydroxy-2-methyl-1-phenylpropane-1-one.

Examples of commercially available products of the above-described photopolymerization initiators are as follows, but the products are not limited to these examples.

Irgacure 184, 369, 651, 500, 819, 907, 784, and 2959, CGI-1700, -1750, and -1850, CG24-61, Darocur 1116 and 1173, Lucirin® TPO, LR8893, and LR8970 (manufactured by BASF), and Ubecryl P36 (manufactured by UCB).

Of the above-described photopolymerization initiators, the component (b) is preferably an acylphosphine oxide-based polymerization initiator. Note that of the above-described radical generators, the acylphosphine oxide-based polymerization initiators are as follows.

Acylphosphine oxide compounds such as 2,4,6-trimethylbenzoyl diphenylphosphine oxide, bis(2,4,6-trimethylbenzoyl)phenylphosphine oxide, and bis(2,6-dimethoxybenzoyl)-2,4,4-trimethylpentylphosphine oxide.

Examples of the thermal polymerization initiator usable as the component (b) are an organic peroxide and an azo compound.

Examples of the organic peroxide are t-butylhydroperoxide, cumene hydroperoxide, t-butyl peroxyacetate, t-butyl peroxybenzoate, t-butyl peroxyoctanoate, t-butyl peroxyneodecanoate, t-butyl peroxyisobutyrate, lauroyl peroxide (LPO), t-amyl peroxypivalate, t-butyl peroxypivate, dicumyl peroxide, benzoyl peroxide (BPO), potassium persulfate, and ammonium persulfate.

Examples of azo compound are azobisisobutyronitrile (AIBN), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butyl azo)-2-cyanopropan, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N'-dimethylene isobutyramidine)dichloride, 2,2'-azobis(2-amidinopropan) dichloride, 2,2'-azobis(N,N-dimethylene isobutyramide), 2,2'-azobis(2-methyl-N-[1,1-bis(hydroxymethyl)-2-hydroxyethyl]propionamide), 2,2'-azobis(2-methyl-N-[1,1-bis (hydroxymethyl)ethyl]propionamide), 2,2'-azobis[2-methyl-N-(2-hydroxyethyl)propionamide], and 2,2'-azobis (isobutyramide) dihydrate.

From the viewpoint of storage stability, the 10-hr half-life temperature of the thermal polymerization initiator is preferably 60° C. or more, more preferably 80° C. or more, and particularly preferably 100° C. or more.

The blending ratio of the component (b) in the curable composition (A) is preferably 0.1 wt % or more and 50 wt % or less with respect to the sum of the component (a), the component (b), and a component (c) (to be described later), that is, the total mass of all the components except for the solvent (d). Also, the blending ratio of the component (b) in the curable composition (A) is more preferably 0.1 wt % or more and 20 wt % or less, and further preferably 1 wt % or more and 20 wt % or less with respect to the total mass of all the components except for the solvent (d). When the blending ratio of the component (b) is set at 0.1 wt % or more, the curing rate of the composition increases, so the reaction efficiency can be improved. Also, when the blending ratio of the component (b) is set at 50 wt % or less, a cured film having mechanical strength to some extent can be obtained.

<Component (c): Nonpolymerizable Compound>

In addition to the components (a) and (b) described above, the curable composition (A) of the present invention can further contain a nonpolymerizable compound as the component (c) within a range that does not impair the effect of the present invention. An example of the component (c) is a compound that does not contain a polymerizable functional group such as a (meth)acryloyl group, and does not have the ability to sense light having a predetermined wavelength and generate the polymerization factor (radical) described previously. Examples of the nonpolymerizable compound are a sensitizer, a hydrogen donor, an internal mold release agent, an antioxidant, a polymer component, and other additives. The component (c) can contain a plurality of types of the above-described compounds.

The sensitizer is a compound that is properly added for the purpose of promoting the polymerization reaction and improving the reaction conversion rate. As the sensitizer, it is possible to use one type of a compound alone, or to use two or more types of compounds by mixing them.

An example of the sensitizer is a sensitizing dye. The sensitizing dye is a compound that is excited by absorbing light having a specific wavelength and has an interaction with a photopolymerization initiator as the component (b). The "interaction" herein mentioned is energy transfer or electron transfer from the sensitizing dye in the excited state to the photopolymerization initiator as the component (b). Practical examples of the sensitizing dye are as follows, but the sensitizing dye is not limited to these examples.

An anthracene derivative, an anthraquinone derivative, a pyrene derivative, a perylene derivative, a carbazole derivative, a benzophenone derivative, a thioxanthone derivative, a xanthone derivative, a coumarin derivative, a phenothiazine derivative, a camphorquinone derivative, an acridinic dye, a thiopyrylium salt-based dye, a merocyanine-based dye, a quinoline-based dye, a styryl quinoline-based dye, a ketocoumarin-based dye, a thioxanthene-based dye, a xanthene-based dye, an oxonol-based dye, a cyanine-based dye, a rhodamine-based dye, and a pyrylium salt-based dye.

The hydrogen donor is a compound that reacts with an initiation radical generated from the photopolymerization initiator as the component (b) or a radical at a polymerization growth end, and generates a radical having higher reactivity. The hydrogen donor is preferably added when the photopolymerization initiator as the component (b) is a photo-radical generator.

Practical examples of the hydrogen donor as described above are as follows, but the hydrogen donor is not limited to these examples.

Amine compounds such as n-butylamine, di-n-butylamine, tri-n-butylphosphine, allylthiourea, s-benzylisothiuronium-p-toluenesulfinate, triethylamine, diethylaminoethyl methacrylate, triethylenetetramine, 4,4'-bis(dialkylamino) benzophenone, N,N-dimethylamino ethylester benzoate, N,N-dimethylamino isoamylester benzoate, pentyl-4-dimethylamino benzoate, triethanolamine, and N-phenylglycine; and mercapto compounds such as 2-mercapto-N-phenylbenzoimidazole and mercapto propionate ester.

It is possible to use one type of a hydrogen donor alone, or to use two or more types of hydrogen donors by mixing them. The hydrogen donor can also have a function as a sensitizer.

In order to control the contact angle of the curable composition (droplets) dropped onto the substrate to the substrate, a surfactant can be added to the curable composition. As the surfactant, it is possible to use surfactants such as a silicon-based surfactant, a fluorine-based surfactant, and a hydrocarbon-based surfactant. Note that the surfactant according to the present invention is not polymerizable. It is possible to use one type of a surfactant alone, or to use two or more types of surfactants by mixing them.

The fluorine-based surfactant includes the following.

A polyalkylene oxide (for example, polyethylene oxide or polypropylene oxide) adduct of alcohol having a perfluoroalkyl group, and a polyalkylene oxide (for example, polyethylene oxide or polypropylene oxide) adduct of perfluoropolyether.

Note that the fluorine-based surfactant can have a hydroxyl group, an alkoxy group, an alkyl group, an amino group, or a thiol group in a portion (for example, a terminal group) of the molecular structure. An example is pentadecaethyleneglycol mono1H,1H,2H,2H-perfluorooctylether.

It is also possible to use a commercially available product as the fluorine-based surfactant. Examples of the commercially available product of the fluorine-based surfactant are as follows.

MEGAFACE® F-444, TF-2066, TF-2067, and TF-2068, and DEO-15 (abbreviation) (manufactured by DIC); Fluorad FC-430 and FC-431 (manufactured by Sumitomo 3M); Surflon® S-382 (manufactured by AGC); EFTOP EF-122A, 122B, 122C, EF-121, EF-126, EF-127, and MF-100 (manufactured by Tochem Products); PF-636, PF-6320, PF-656, and PF-6520 (manufactured by OMNOVA Solutions); UNIDYNE® DS-401, DS-403, and DS-451 (manufactured by DAIKIN); and FUTAGENT® 250, 251, 222F, and 208G (manufactured by NEOS).

The surfactant can also be a hydrocarbon-based surfactant. The hydrocarbon-based surfactant includes an alkyl alcohol polyalkylene oxide adduct obtained by adding alkylene oxide having a carbon number of 2 to 4 to alkyl alcohol having a carbon number of 1 to 50, and polyalkylene oxide.

Examples of the alkyl alcohol polyalkylene oxide adduct are as follows.

A methyl alcohol ethylene oxide adduct, a decyl alcohol ethylene oxide adduct, a lauryl alcohol ethylene oxide adduct, a cetyl alcohol ethylene oxide adduct, a stearyl alcohol ethylene oxide adduct, and a stearyl alcohol ethylene oxide/propylene oxide adduct.

Note that the terminal group of the alkyl alcohol polyalkylene oxide adduct is not limited to a hydroxyl group that can be manufactured by simply adding polyalkylene oxide to alkyl alcohol. This hydroxyl group can also be substituted by a polar functional group such as a carboxyl group, an amino group, a pyridyl group, a thiol group, or a silanol group, or by a hydrophobic group such as an alkyl group or an alkoxy group.

Examples of polyalkylene oxide are as follows.

Polyethylene glycol, polypropylene glycol, their mono or dimethyl ether, mono or dioctyl ether, mono or dinonyl ether, and mono or didecyl ether, monoadipate, monooleate, monostearate, and monosuccinate.

A commercially available product can also be used as the alkyl alcohol polyalkylene oxide adduct. Examples of the commercially available product of the alkyl alcohol polyalkylene oxide adduct are as follows.

Polyoxyethylene methyl ether (a methyl alcohol ethylene oxide adduct) (BLAUNON MP-400, MP-550, and MP-1000) manufactured by AOKI OIL INDUSTRIAL, polyoxyethylene decyl ether (a decyl alcohol ethylene oxide adduct) (FINESURF D-1303, D-1305, D-1307, and D-1310) manufactured by AOKI OIL INDUSTRIAL, polyoxyethylene lauryl ether (a lauryl alcohol ethylene oxide adduct) (BLAUNON EL-1505) manufactured by AOKI OIL INDUSTRIAL, polyoxyethylene cetyl ether (a cetyl alcohol ethylene oxide adduct) (BLAUNON CH-305 and CH-310) manufactured by AOKI OIL INDUSTRIAL, polyoxyethylene stearyl ether (a stearyl alcohol ethylene oxide adduct) (BLAUNON SR-705, SR-707, SR-715, SR-720, SR-730, and SR-750) manufactured by AOKI OIL INDUSTRIAL, randomly polymerized polyoxyethylene polyoxypropylene stearyl ether (BLAUNON SA-50/50 1000R and SA-30/70 2000R) manufactured by AOKI OIL INDUSTRIAL, polyoxyethylene methyl ether (Pluriol® A760E) manufactured by BASF, and polyoxyethylene alkyl ether (EMULGEN series) manufactured by KAO.

A commercially available product can also be used as polyalkylene oxide. An example is an ethylene oxide/propylene oxide copolymer (Pluronic PE6400) manufactured by BASF.

The blending ratio of the component (c) in the curable composition (A) is preferably 0 wt % or more and 50 wt % or less with respect to the sum of the components (a), (b), and (c), that is, the total mass of all the components except for the solvent (d). The blending ratio of the component (c) in the curable composition (A) is more preferably 0.1 wt % or more and 50 wt % or less, and further preferably 0.1 wt % or more and 20 wt % or less with respect to the total mass of all the components except for the solvent (d). When the blending ratio of the component (c) is set at 50 wt % or less, a cured film having mechanical strength to some extent can be obtained.

<Component (d): Solvent>

The curable composition (A) of the present invention contains a solvent having a boiling point of 80° C. or more and less than 250° C. at normal pressure as the component (d) that is a volatile component. The component (d) is a solvent that dissolves the components (a), (b), and (c). Examples are an alcohol-based solvent, a ketone-based solvent, an ether-based solvent, and a nitrogen-containing solvent. As the component (d), it is possible to use one type of a component alone, or to use two or more types of components by combining them. That is, the component (d) can contain one or more types of solvents. The boiling point at normal pressure of the component (d) is 80° C. or more, and preferably 140° C. or more. If the boiling point of the component (d) at normal pressure is less than 80° C., the volatilization rate in a waiting step (to be described later) is too high, so it is possible that the component (d) volatilizes before droplets of the curable composition (A) combine with each other, so the droplets of the curable composition (A) do not combine. Also, if the boiling point at normal pressure of the component (d) is 250° C. or more, it is possible that the volatilization of the component (d) is insufficient in the waiting step (to be described later), so the component (d) remains in the cured product of the curable composition (A). Note that the component (d) will sometimes be referred to as the "solvent (d)" hereinafter.

The curable composition (A) according to the present invention may be a composition substantially containing no solvent (d). Here, substantially containing no solvent (d) is defined as the content of the solvent (d) in the curable composition (A) being 1 wt % or less.

Examples of the alcohol-based solvent are as follows.

Monoalcohol-based solvents such as methanol, ethanol, n-propanol, iso-propanol, n-butanol, iso-butanol, sec-butanol, tert-butanol, n-pentanol, iso-pentanol, 2-methylbutanol, sec-pentanol, tert-pentanol, 3-methoxybutanol, n-hexanol, 2-methylpentanol, sec-hexanol, 2-ethylbutanol, sec-heptanol, 3-heptanol, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, phenylmethylcarbinol, diacetone alcohol, and cresol; and polyalcohol-based solvents such as ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, triethylene glycol, tripropylene glycol, and glycerin.

Examples of the ketone-based solvent are as follows.

Acetone, methylethylketone, methyl-n-propylketone, methyl-n-butylketone, diethylketone, methyl-iso-butylketone, methyl-n-pentylketone, ethyl-n-butylketone, methyl-n-hexylketone, di-iso-butylketone, trimethylnonanone, cyclohexanone, methylcyclohexanone, 2,4-pentanedione, acetonylacetone, diacetone alcohol, acetophenone, and fenthion.

Examples of the ether-based solvent are as follows.

Ethyl ether, iso-propyl ether, n-butyl ether, n-hexyl ether, 2-ethylhexyl ether, ethylene oxide, 1,2-propylene oxide, dioxolane, 4-methyldioxolane, dioxane, dimethyldioxane, 2-methoxyethanol, 2-ethoxyethanol, ethylene glycol diethyl ether, 2-n-butoxyethanol, 2-n-hexoxyethanol, 2-phenoxyethanol, 2-(2-ethylbutoxy)ethanol, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, 1-n-butoxy-2-propanol, 1-phenoxy-2-propanol, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tetrahydrofuran, and 2-methyltetrahydrofuran.

Examples of the ester-based solvent are as follows.

Diethyl carbonate, methyl acetate, ethyl acetate, amyl acetate, γ-butyrolactone, γ-valerolactone, n-propyl acetate, iso-propyl acetate, n-butyl acetate, iso-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxy triglycol acetate, ethyl propionate, n-butyl propionate, iso-amyl propionate, diethyl oxalate, di-n-butyl oxalate, methyl lactate, ethyl lactate, n-butyl lactate, n-amyl lactate, diethyl malonate, dimethyl phthalate, and diethyl phthalate.

Examples of the nitrogen-containing solvent are as follows.

N-methylformamide, N,N-dimethylformamide, N,N-diethylformamide, acetoamide, N-methylacetoamide, N,N-dimethylacetoamide, N-methylpropionamide, and N-methylpyrrolidone.

Of the above-described solvents, the ether-based solvent and the ester-based solvent are favorable. Note that an ether-based solvent and an ester-based solvent each having a glycol structure are more favorable from the viewpoint of good film formation properties.

Further favorable examples are as follows.

Propylene glycol monomethyl ether, propylene glycol monoethyl ether, propylene glycol monopropyl ether, propylene glycol monomethyl ether acetate, propylene glycol monoethyl ether acetate, and propylene glycol monopropyl ether acetate.

A particularly favorable example is propylene glycol monomethyl ether acetate. Note that ethylisocyanurate di(meth)acrylate is also favorable.

In the present invention, a favorable solvent is a solvent having at least one of an ester structure, a ketone structure, a hydroxyl group, and an ether structure. More specifically, a favorable solvent is one solvent or a solvent mixture selected from propylene glycol monomethyl ether acetate (boiling point=146° C.), propylene glycol monomethyl ether (boiling point=120° C.), cyclohexanone (boiling point=156° C.), 2-haptanone (boiling point=151° C.), γ-butyrolactone (boiling point=204° C.), and ethyl lactate (boiling point=151° C.).

In the present invention, a polymerizable compound having a boiling point of 80° C. or more and less than 250° C. at normal pressure is also usable as the component (d). Examples of the polymerizable compound having a boiling point of 80° C. or more and less than 250° C. at normal pressure are as follows.

Cyclohexyl acrylate (198° C.), benzyl acrylate (229° C.), isobornyl acrylate (245° C.), tetrahydrofurfuryl acrylate (202° C.), trimethylcyclohexyl acrylate (232° C.), isooctyl acrylate (217° C.), n-octyl acrylate (228° C.), ethoxyethoxyethyl acrylate (boiling point=230° C.), divinylbenzene (193° C.), 1,3-diisopropenylbenzene (218° C.), styrene (145° C.), and α-methylstyrene (165° C.).

In the present invention, when the whole of the curable composition (A) is 100 vol %, the content of the solvent (d) is 70 vol % or more and 95 vol % or less, preferably 80 vol % or more and 95 vol % or less, and further preferably 80 vol % or more and 90 vol % or less. If the content of the solvent (d) is smaller than 5 vol %, no thin film can be obtained after the solvent (d) volatilized even under the condition that a practically continuous liquid film can be obtained. On the other hand, if the content of the solvent (d) is larger than 95 vol %, no thick film can be obtained after the solvent (d) volatilized even when droplets are closely dropped by an inkjet method.

<Temperature when Blending Curable Composition>

When preparing the curable composition (A) of the present invention, at least the components (a), (b), (c), and (d) are mixed and dissolved under a predetermined temperature condition. More specifically, the predetermined temperature condition is 0° C. or more and 100° C. or less.

<Viscosity of Curable Component>

The curable composition (A) of the present invention is a liquid. This is so because droplets of the curable composition (A) are discretely dropped on a substrate by an inkjet method in an arranging step (to be described later). The viscosity of the curable composition (A) of the present invention is 1.3 mPa·s or more and 60 mPa·s or less, and preferably 1.5 mPa·s or more and 60 mPa·s or less. The viscosity is more preferably 2.0 mPa·s or more and 30 mPa·s or less, and further preferably 5 mPa·s or more and 15 mPa·s or less. If the viscosity of the curable composition (A) is smaller than 1.3 mPa·s, the discharge property of droplets by an inkjet method becomes unstable. Also, if the viscosity of the curable composition (A) is larger than 60 mPa·s, it is impossible to form droplets having a volume of about 1.0 to 3.0 μL favorable in the present invention.

The viscosity in a state in which the solvent (d) volatilized from the curable composition (A), that is, the viscosity at 25° C. of a mixture (nonvolatile component) of components except for the solvent (d) of the curable composition (A) is preferably 10 mPa·s or more and 10,000 mPa·s or less. The viscosity is preferably 30 mPa·s or more and 10,000 mPa·s or less, and more preferably 30 mPa·s or more and 1,000 mPa·s or less. The viscosity is further preferably 30 mPa·s or more and 500 mPa·s or less, and particularly preferably 120 mPa·s or more and 500 mPa·s or less. When the viscosity of the components except for the solvent (d) of the curable composition (A) is set to 1,000 mPa·s or less, the curable composition (A) can be made to flow even after volatilization of the solvent (d from the curable composition (A), and a flatter film is formed. Also, when the viscosity of components except for the solvent (d) of the curable composition (A) is set to 1 mPa·s or more, it is possible to prevent an unnecessary flow of droplets of the curable composition (A) after the solvent (d) volatilized.

<Surface Tension of Curable Composition>

The surface tension of the curable composition (A) of the present invention is as follows. The surface tension at 23° C. of the composition containing the components except for the solvent (component (d)) is preferably 5 mN/m or more and 70 mN/m or less. The surface tension at 23° C. of the composition containing the components except for the solvent (component (d)) is more preferably 7 mN/m or more and 50 mN/m or less, and further preferably 10 mN/m or more and 40 mN/m or less. Note that when the surface tension is high, for example, 5 mN/m or more, planarization can quickly be completed in the waiting step to be described later. Also, when the surface tension is 70 mN/m or less, a cured film obtained by curing the curable composition has surface smoothness.

<Contact Angle of Curable Composition>

The contact angle of the curable composition (A) of the present invention is as follows. That is, the contact angle of the composition containing the components except for the solvent (component (d)) is preferably 0° or more and 900 or less with respect to the surface of the substrate. The contact angle is further preferably 0° or more and 30° or less, and particularly preferably 0° or more and 10° or less. If the contact angle is larger than 90°, a droplet hardly spreads. The smaller the contact angle is, the more quickly the droplet spreads.

<Impurities Mixed in Curable Composition>

The curable composition (A) of the present invention preferably contains impurities as little as possible. Note that impurities mean components other than the components (a), (b), (c), and (d) described above. Therefore, the curable composition (A) of the present invention is favorably a composition obtained through a refining step. A refining step like this is preferably filtration using a filter.

As this filtration using a filter, it is favorable to mix the components (a), (b), and (c) described above, and filtrate the mixture by using, for example, a filter having a pore diameter of 0.001 μm or more and 5.0 μm or less. When performing filtration using a filter, is it further favorable to perform the filtration in multiple stages, or to repetitively perform the filtration a plurality of times (cycle filtration). It is also possible to re-filtrate a liquid once filtrated through a filter, or perform filtration by using filters having different pore diameters. Examples of the filter for use in filtration are filters made of, for example, a polyethylene resin, a polypropylene resin, a fluorine resin, and a nylon resin, but the filter is not particularly limited. Impurities such as particles mixed in the curable composition can be removed through the refining step as described above. Consequently, it is possible to prevent impurities mixed in the curable composition from forming unexpected unevenness on a cured film obtained after the curable composition is cured.

Note that when using the curable composition of the present invention in order to fabricate a semiconductor integrated circuit, it is favorable to avoid mixing of impurities (metal impurities) containing metal atoms in the curable composition as much as possible so as not to obstruct the operation of a product. The concentration of the metal impurities contained in the curable composition is preferably 10 ppm or less, and more preferably 100 ppb or less.

[Substrate]

In this specification, a member on which droplets of the curable composition (A) are discretely dropped is explained as a substrate. This substrate is, for example, a substrate to be processed, and a silicon wafer having, on the outermost surface, unevenness with a height difference of about 10 to 1,000 nm is used. The substrate can have a layer to be processed on the surface. On the substrate, another layer can also be formed below the layer to be processed. However, the substrate is not limited to a silicon wafer. The substrate can freely be selected from those known as semiconductor device substrates such as aluminum, a titanium-tungsten alloy, an aluminum-silicon alloy, an aluminum-copper-silicon alloy, silicon oxide, and silicon nitride. Note that the surface of the substrate or of the layer to be processed may be treated by a surface treatment such as a silane coupling treatment, a silazane treatment, or deposition of an organic thin film, thereby improving the adhesion to the curable composition (A). As a practical example of the organic thin film to be deposited as the surface treatment, an adhesive layer described in PTL 3 can be used.

[Film Forming Method]

Figure 2:
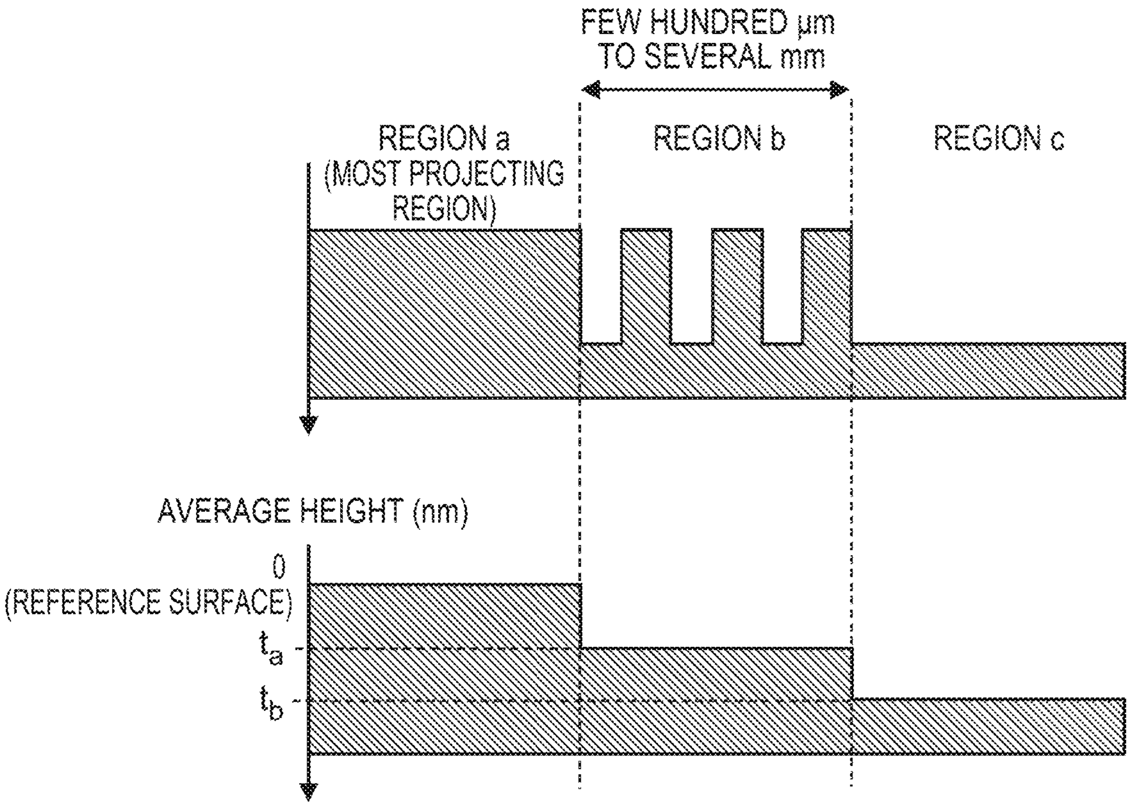
FIG. 2 is a view for explaining definition of an average height.
Figure 3:
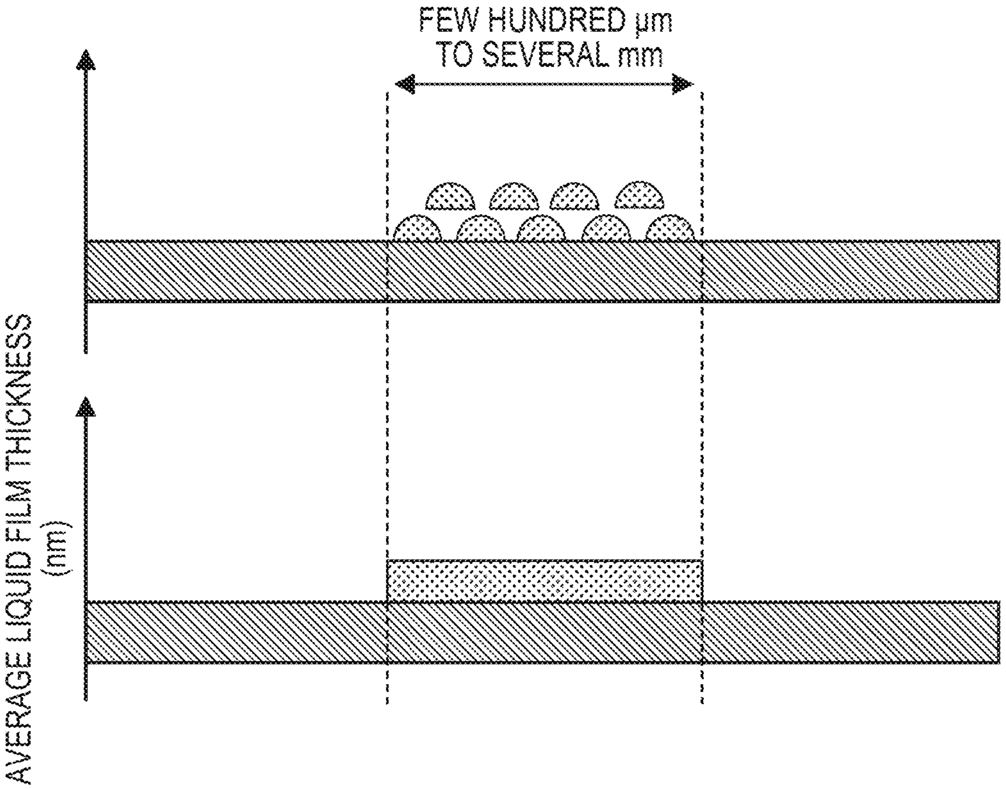
FIG. 3 is a view for explaining definition of an average liquid film thickness.
Figure 4A:
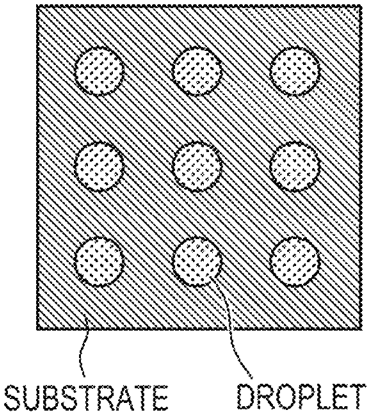
FIGS. 4A to 4D are plan views for explaining the film forming method according to the present invention.
Figure 4B:
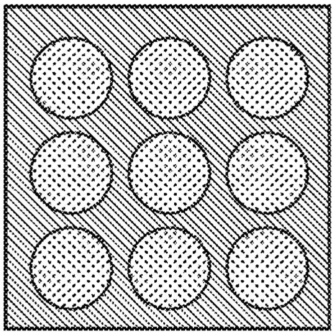
Figure 4C:
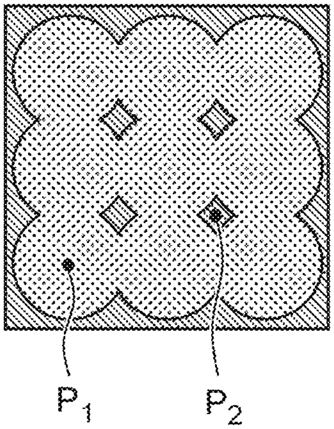
Figure 4D:
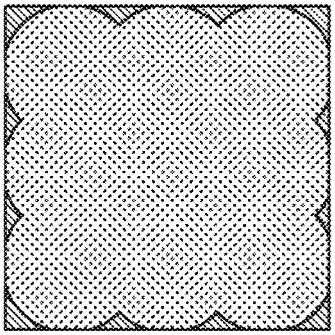
Figure 5A:
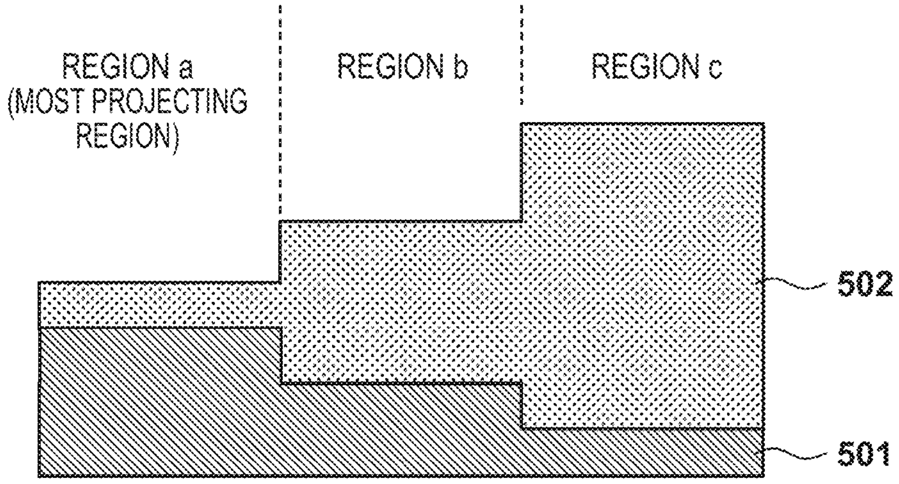
FIGS. 5A to 5C are sectional views for explaining the film forming method according to the present invention.
Figure 5B:
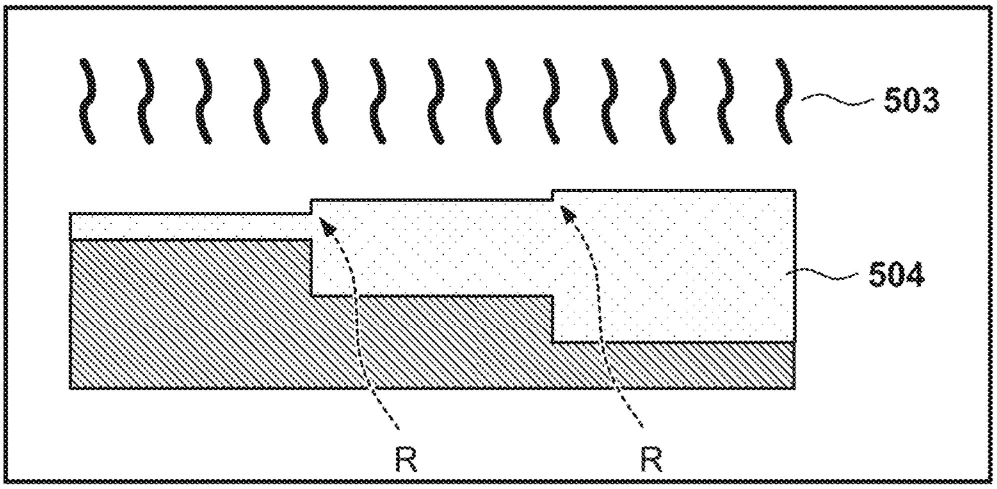
Figure 5C:
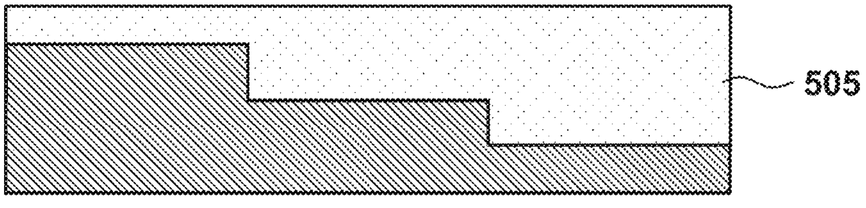

A film forming method according to the present invention will be described next with reference to FIGS. 1A to 5C. FIGS. 1A to 1F are schematic views showing the film forming method according to the present invention. FIG. 2 is a view for explaining definition of the surface height (average height) of a substrate. FIG. 3 is a view for explaining definition of an average liquid film thickness. FIGS. 4A to 4D are schematic views showing the substrate viewed from above so as to explain the film forming method according to the present invention. FIGS. 5A to 5C are schematic views showing a cross section of the substrate so as to explain the film forming method according to the present invention. Note that FIGS. 1A to 1F and FIGS. 4A to 4D shows a substrate having a flat surface to simplify the explanation. In fact, a step difference (unevenness) is formed on the substrate. That is, the actual substrate includes a most projecting part plane and a plurality of regions whose average height is lower than the most projecting part plane.

In the following description, the surface height of the substrate is defined by an index called an average height, as shown in FIG. 2, and this is defined for each of the plurality of regions of the substrate. In the plurality of regions, the configurations of uneven patterns (the presence/absence of an uneven pattern, the pitch, the width, the height of a convex portion, the depth of a concave portion, and the like) formed on the substrate are different from each other. The upper view of FIG. 2 shows a cross section of a substrate 101 including regions a, b, and c as the plurality of regions, and the lower view of FIG. 2 shows the average heights (surface heights) of the regions a to c. The region a is a most projecting region (most projecting part region) on the substrate where no uneven pattern is formed, and the height of the upper surface of the region a is defined as the average height (surface height). The region b is a region where an uneven pattern is formed, and the average value of the height of the bottom surface of the concave portion and the height of the upper surface of the convex portion in the region b is defined as the average height (surface height). The region c is a region where no uneven pattern is formed, and the height of the upper surface of the region c is defined as the average height (surface height).

Also, in the following description, the surface of the average height in the region (most projecting region) with the highest average height on the substrate 101 is defined as a reference surface. In the example shown in FIG. 2, since the region a is the most projecting region, the surface of the average height in the region a is defined as the reference surface. In this case, the region b is defined as a surface whose average height is lower by ta than the region a that is the reference surface. Similarly, the region c is defined as a surface whose average height is lower by tb than the region a that is the reference surface.

The film forming method according to the present invention is a method of forming a flat film of the curable composition (A) on a substrate, and includes an arranging step, a waiting step, and a curing step. The arranging step is a step of discretely arranging a plurality of droplets of the curable composition (A) on a substrate (on a substrate surface) having a step difference (unevenness). In the arranging step, for example, the droplets of the curable composition (A) are densely arranged in a concave portion of the substrate, and the curable composition (A) is coarsely arranged in a convex portion of the substrate. The waiting step is a step of waiting until the plurality of droplets of the curable composition (A) arranged on the substrate in the arranging step combine with each other to form a liquid film of the curable composition (A) on the substrate, and is executed after the arranging step. The waiting step may be understood as a step of waiting until the solvent (d) volatilizes from the curable composition (A) arranged on the substrate in the arranging step. The curing step is a step of curing the liquid film of the curable composition (A) on the substrate by light irradiation or heating, and is executed after the waiting step.

Here, in the film forming method according to the present invention, unlike the conventional planarization technique, a mold (also called a superstrate) having a flat surface is not used, and a contact step of bringing the mold into contact with a curable composition on a substrate is not performed. In the conventional planarization technique using a mold, since the curable composition and the mold are brought into contact in a state in which a plurality of droplets of the curable composition arranged on the substrate do not combine with each other, a lot of bubbles are entrapped between the mold and the curable composition on the substrate. Hence, a long time is needed until the bubbles are diffused to the mold or the substrate and disappear, and this is one of factors for lowering productivity (throughput). In the film forming method according to the present invention, since no mold is used, bubbles are entrapped little in the curable composition, and this may be advantageous in terms of productivity.

Also, in the film forming method according to the present invention, since the waiting step and the curing step to be described later are performed, a flat cured film of the curable composition (A) having a height difference smaller than the step difference (unevenness) on the substrate surface can be formed. The thickness of the flat cured film, that is, the cured film of the curable composition formed on the substrate by the film forming method according to the present invention is preferably 1 to 10,000 nm in the most projecting region of the substrate. As a result of planarization, the thickness of the cured film in the convex portion of the substrate is smaller than the thickness of the cured film in the concave portion of the substrate, and the thickness difference equals the maximum height difference between the concave portion and the convex portion of the substrate.

<Arranging Step>

In the arranging step, as schematically shown in FIG. 1A, a plurality of droplets 102 of the curable composition (A) in a liquid form are discretely arranged on the substrate 101. As the arranging method of arranging the droplets 102 of the curable composition (A) on the substrate, an inkjet method is preferably used. The volume of the droplets to be dropped is 0.1 pL or more and 1,000 pL or less, preferably 0.1 pL or more to 100 pL, and particularly preferably 0.6 pL or more to 10 pL. If the sum of droplet volumes is the same, the smaller the average droplet volume is, and the higher the droplet arrangement density is, the narrower the droplet interval is. For this reason, the droplets quickly combine, and the time until the liquid film surface of the curable composition is planarized in the waiting step to be described later is short.

Here, in the region where the average height is constant, the density of the droplets of the curable composition (A) to be dropped is constant. Also, in the following explanation, the volume of the curable composition (A) arranged as the plurality of droplets on the substrate in the arranging step is converted into an index called an average liquid film thickness as shown in FIG. 3 and defined. The average liquid film thickness is a liquid film thickness assumed from the volume and the number of droplets of the curable composition arranged on a predetermined region of the substrate in the arranging step. That is, a value obtained by calculating the volume of the curable composition from the volume and the number of droplets of the curable composition arranged on the predetermined region of the substrate in the arranging step and averaging the volume by the area of the predetermined region, is defined as the average liquid film thickness in the predetermined region. Note that a detailed example (embodiment) of the arranging step will be described later.

<Waiting Step>

Figure 1B:
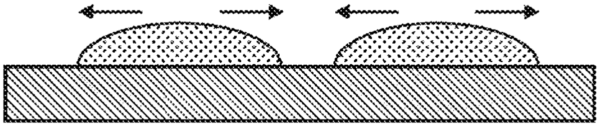
Figure 1C:
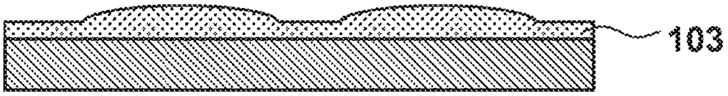
Figure 1D:
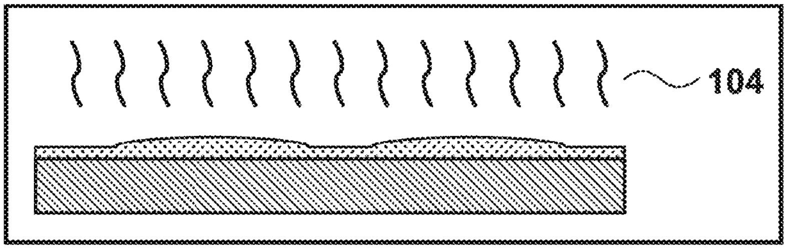
Figure 1E:
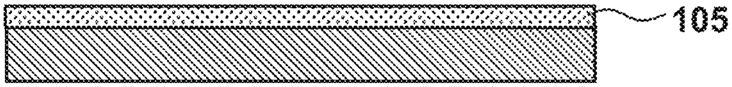

In the film forming method according to the present invention, the waiting step is provided after the arranging step and before the curing step. A flow behavior during the waiting step of the curable composition (A) arranged as the plurality of droplets on the substrate 101 will be explained with reference to FIGS. 1A to 1F (sectional views) and FIGS. 4A to 4D (plan views). The plurality of droplets 102 of the curable composition (A) are discretely arranged on the substrate 101, as shown in FIGS. 1A and 4A, and each droplet 102 gradually spreads on the substrate 101 as shown in FIGS. 1B and 4B. Then, the adjacent droplets 102 of the curable composition (A) on the substrate 101 begin combining with each other to form a liquid film 103, as shown in FIGS. 1C and 4C, and the continuous liquid film 103 is formed, as shown in FIGS. 1D and 4D. At the end of the waiting step, as shown in FIG. 1E, the whole surface of the substrate 101 is covered with a liquid film 105 of the curable composition (A), and exposed surfaces are eliminated. The state of the curable composition (A) as shown in FIG. 1E is sometimes called "a practically continuous liquid film".

In addition, as schematically shown in FIG. 1D, the solvent (d) 104 contained in the liquid film 103 is volatilized in the waiting step. Assuming that the total weight of the components except for the solvent (d) is 100 vol %, the residual amount (volume fraction) of the solvent (d) in the liquid film 105 at the end of the waiting step is preferably 10 vol % or less. If the residual amount of the solvent (d) is larger than 10 vol %, the mechanical properties of the cured film of the curable composition (A) formed after the curing step may deteriorate.

In the waiting step, it is possible to perform a baking step of heating the substrate 101 and the curable composition (A), or ventilate the atmospheric gas around the substrate 101, for the purpose of accelerating the volatilization of the solvent (d). Heating can be performed at, for example, 30° C. or more and 200° C. or less, preferably 80° C. or more and 150° C. or less, and more preferably 90° C. or more and 110° C. or less. The heating time can be 10 sec or more and 3,000 sec or less. The baking step can be performed by using a known heater such as a hotplate or an oven. Note that since not only volatilization of the solvent (d) but also flow of the nonvolatile component is accelerated in the baking step, the unevenness on the liquid film surface is relaxed, and planarization is promoted.

The waiting step is, for example, 0.1 to 3,000 sec, and preferably 10 to 300 sec. If the waiting step is shorter than 0.1 sec, the combination of the droplets of the curable composition (A) becomes insufficient, so no practically continuous liquid film is formed. If the waiting step exceeds 600 sec, the productivity decreases. To suppress the decrease in productivity, therefore, it is also possible to sequentially move substrates 101 completely processed in the arranging step to the waiting step, perform the waiting step in parallel to a plurality of substrates 101, and sequentially move the substrates completely processed in the waiting step to the curing step. Note that in the related art, a few thousands of seconds to a few tens of thousands of seconds are theoretically required before a practically continuous liquid film is formed. In practice, however, it is difficult to form a continuous liquid film because the spread of the droplets of the curable composition stagnates due to the influence of volatilization.

<Curing Step>

Figure 1F:
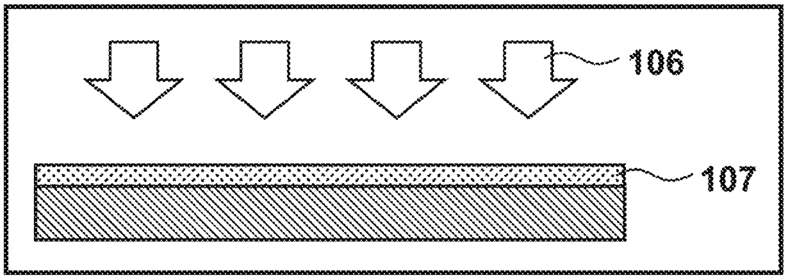

In the curing step, the curable composition (A) is cured by applying light and/or heat as curing energy, thereby forming a cured film. FIG. 1F schematically shows an example in which the liquid film 105 of the curable composition (A) formed on the substrate 101 in the waiting step is irradiated with light 106, thereby forming a cured film 107 of the curable composition (A). As described above, as the curing method of the liquid film 105 of the curable composition (A), not light irradiation but heating using a known heater such as a hot plate or an oven may be used. The cured film 107 of the curable composition (A) is thus formed. Also, at the time of curing of the curable composition, a van der Waals distance kept by molecules in the liquid film changes to a covalent distance due to polymerization or cross-linking and accordingly, curing shrinkage occurs. In the film forming technique according to the present invention, curing shrinkage occurs in the direction perpendicular to the surface of the substrate, that is, appears as a decrease of the film thickness.

If light is used as the curing energy, the irradiation light 106 is selected in accordance with the sensitivity wavelength of the curable composition (A). More specifically, the irradiation light 106 is properly selected from ultraviolet light, X-rays, and an electron beam each having a wavelength of 150 nm or more and 400 nm or less. Note that the irradiation light 106 is particularly preferably ultraviolet light. This is so because many compounds commercially available as curing assistants (photopolymerization initiators) have sensitivity to ultraviolet light. Examples of a light source that emits ultraviolet light are a high-pressure mercury lamp, an ultrahigh-pressure mercury lamp, a low-pressure mercury lamp, a Deep-UV lamp, a carbon arc lamp, a chemical lamp, a metal halide lamp, a xenon lamp, a KrF excimer laser, an ArF excimer laser, and an $F_2$ laser. Note that the ultrahigh-pressure mercury lamp is particularly favorable as the light source for emitting ultraviolet light. It is possible to use one light source or a plurality of light sources. Light can be emitted to the entire region of the arranged curable composition (A), or to only a partial region thereof (by limiting the region). It is also possible to intermittently emit light to the entire region of the substrate a plurality of times, or to continuously emit light to the entire region of the substrate. Furthermore, a first region of the substrate can be irradiated with light in a first irradiation process, and a second region different from the first region of the substrate can be irradiated with light in the second irradiation process.

If the curable composition (A) contains a thermal polymerization initiator as the comment (b), heat can be used as curing energy. The substrate 101 and the curable composition (A) are heated using a known heater such as a hot plate or an oven. Heating is performed, for example, at 30° C. or more and 200° C. or less, preferably at 80° C. or more and 150° C. or less, and more preferably at 90° C. or more and 110° C. or less. The heating time can be 10 sec or more and 3,000 sec or less. If the baking step is performed in the above-described waiting step, the curing step may be omitted. Also, if heating is performed as the curing step, light irradiation may be omitted.

The curing step can be performed in any of a normal air atmosphere, a reduced-pressure atmosphere, and an inert-gas atmosphere. However, the reduced-pressure atmosphere or the inert-gas atmosphere is favorable because it is possible to prevent the influence of oxygen or water on the curing reaction. Practical examples of an inert gas to be used when performing the contact step in the inert-gas atmosphere are nitrogen, carbon dioxide, helium, argon, various freon gases, and gas mixtures thereof. When performing the contact step in a specific gas atmosphere including a normal air atmosphere, a favorable pressure is 0.0001 atm or more and 10 atm or less.

<Repetition>

The film forming method according to the present invention may be performed divisionally in a plurality of times of processing. That is, each of the plurality of times of processing is a series of processes including the arranging step, the waiting step, and the curing step described above in this order and the cured film of the curable composition (A) is formed on the substrate by performing the plurality of times of processing. By performing the plurality of times of processing, a flat film made of the cured film of the curable composition (A) can be obtained at a desired position or in a whole region on the substrate. Repetition of the arranging step, the waiting step, and the curing step (that is, the plurality of times of processing) is performed at each of a plurality of positions on the same substrate, and a flat film can thus be obtained at each of the plurality of positions. Also, the flat film forming method according to the present invention may repetitively be executed for the same position on the same substrate. In this case, a flatter film can be formed.

First Embodiment

In the film forming method according to the present invention, as described above, curing shrinkage of a curable composition (A) occurs in the curing step. The curing shrinkage appears as a decrease of the film of the curable composition (A). Hence, in the arranging step, the curable composition (A) is arranged as a plurality of droplets on a substrate such that the surface position of a liquid film 105 before curing, which is formed on the substrate in the waiting step, becomes higher by an offset amount in a region with a low average height than on a most projecting part plane. The most projecting part plane and the region with the low average height are a plurality of regions divided by the index of the average height, as described above. Also, the offset amount is the difference between the most projecting part plane and the region with the low average height concerning the displacement of the surface of the curable composition (A) caused by curing shrinkage of the curable composition (A) in the curing step (for example, the offset amount is determined as the difference).

FIGS. 5A to 5C schematically show a behavior after the curable composition (A) changes to a practically continuous liquid film in the waiting step. FIGS. 5A to 5C show the behavior of the liquid film in a substrate 501 including regions a, b, and c shown in FIG. 2.

As shown in FIG. 5A, a liquid film 502 of the curable composition (A) is deposited (arranged) on the substrate 501 in the arranging step such that the film thickness (average liquid film thickness) becomes large in the region with the low average height. The liquid film 502 is flat in a region with a constant average height, but a step difference is generated at the boundary to a region with a different average height.

As shown in FIG. 5B, when a solvent (d) 503 volatilizes in the waiting step, a practically continuous liquid film 504 formed by components (a), (b), and (c) that are nonvolatile components remains on the substrate 501. The liquid film 504 is thinner than the liquid film 502 because the surface of the curable composition (A) displaces by the amount of the removed solvent (d) 503. At this time, the thicker the liquid film 502 is, the larger the volatilization amount of the component (d) 503 is. Hence, the displacement amount of the surface of the curable composition (A) becomes large, and the difference of the surface position of the liquid film 504 between the regions a to c becomes small.

Also, as shown in FIG. 5B, the liquid film 504 (before curing) after the waiting step is flat in each region with a constant average height, but a step difference considering curing shrinkage of the curable composition in the curing step is formed at the boundary to a region with a different average height. The height of the step difference is the above-described offset amount, that is, the difference of displacement of the surface of the curable composition (A) caused by curing shrinkage of the curable composition (A) in the curing step. The step difference as the offset amount is provided at each of the boundary portion between the region a and the region b and the boundary portion between the region b and the region c, as indicated by broken line arrows R in FIG. 5B. When the step difference (offset amount) is provided on the liquid film 504 after the waiting step, as shown in FIG. 5C, a flat cured film 505 of the curable composition (A) can be formed on the substrate 501 by curing shrinkage of the curable composition (A) in the curing step.

In the film forming method according to the present invention, the curable composition (A) is arranged as a plurality of droplets on the substrate in the arranging step such that a step difference (offset amount) is formed on the liquid film 504 after the waiting step. That is, the curable composition (A) is arranged as a plurality of droplets on the substrate in the arranging step such that the surface position of the liquid film 504 before curing, which is formed on the substrate 501 in the waiting step, becomes higher by the offset amount in the region with the low average height than on the most projecting part plane. Also, in the arranging step, the curable composition (A) is arranged as a plurality of droplets on the substrate in the arranging step such that the surface position of the liquid film 502 becomes higher by the volatilization amount of the component (d) from the curable composition in the waiting step in the region with the low average height than on the most projecting part plane. In this case, in the waiting step, the processing can wait until the surface position of the liquid film 504 becomes higher by the offset amount in the region with the low average height than on the most projecting part plane due to volatilization of the component (d) from the curable composition (A). In the waiting step, as described above, processing preferably waits such that the volume fraction of the component (d) in the liquid film 504 becomes 10 vol % or less.

Detailed control of the arranging step will be described next. Here, a region whose average height (surface height) is lower by t (nm) than the most projecting part plane will be described. If the surface of the most projecting part plane (for example, the most projecting region) of the substrate is defined as the reference surface (average height=0 (nm)), a target value T'(t) (nm) of the average liquid film thickness in the region can be calculated by equation (1) below. The average liquid film thickness is a liquid film thickness assumed from the volume and the number of droplets of the curable composition arranged on a predetermined region of the substrate in the arranging step, as described above, and is expressed as "T' (nm)" in equation (1). Also, in equation (1), "T (nm)" indicates the target thickness of the cured film of the curable composition (A) to be formed on the most projecting part plane in the curing step. "Y %" indicates the curing shrinkage rate of the curable composition (A) in the curing step, and "X vol %" indicates the concentration of the nonvolatile components (components (a) to (c)) in the curable composition (A) in the arranging step.

$$T'(t)=(100/X)*(100/(100-Y))*(T+t) \quad (1)$$

In the arranging step, the curable composition (A) is arranged at a plurality of droplets on the substrate such that the average liquid film thickness T' in the region whose average height (surface height) is lower by t (nm) than the most projecting part plane falls within the range of 95% to 105% of the target value T'(t) calculated by equation (1). Here, if the volume of one droplet arranged on the substrate in the arranging step is 1.0 μL, the average liquid film thickness T' before volatilization of the solvent (d) is preferably set to 142 nm or more in each region on the substrate. Thus, a flat liquid film of the curable composition (A) can be formed in each region after the waiting step. For example, if the volume of one droplet is 1.0 μL or more, the liquid film having an average liquid film thickness of 142 nm or more can be obtained by arranging the plurality of droplets at a density of 142 pieces/$mm^2$ or more.

Also, the cured film of the curable composition (A) formed on the substrate after the curing step is flat not only in each region where the average height is constant but also at the boundary portions between the plurality of regions. That is, as shown in FIGS. 5A to 5C, when the average liquid film thickness T' according to the curing shrinkage rate Y % and the average height difference t (nm) is formed in the arranging step, a flat cured film is formed on the whole region of the substrate after volatilization of the solvent (d) and curing shrinkage.

Second Embodiment

The film forming method according to the present invention may be performed divisionally as a plurality of times of processing, as described above. In the second embodiment, detailed control of an arranging step when performing the film forming method divisionally as a plurality of times of processing will be described. As described above, the plurality of times of processing each include an arranging step, a waiting step, and a curing step. Note that the second embodiment basically takes over the first embodiment, and matters except those to be mentioned below are the same as described in the first embodiment. Also, in the second embodiment, a description will be made assuming that the plurality of times of processing include first processing and second processing. As for the order of the first processing and the second processing, the second processing is preferably performed after the first processing. However, the first processing may be performed after the second processing.

In the arranging step of the first processing, a curable composition (A) is arranged as a plurality of droplets on a substrate such that an average liquid film thickness T' in a region whose average height is lower only by t (nm) than the most projecting part plane falls within the range of 95% to 105% of a target value T1' defined by $$T1'(t) = (100/X)) * (100/(100 - Y)) * t \quad (2)$$

In the arranging step of second processing, the curable composition (A) is arranged as a plurality of droplets on the substrate such that the average liquid film thickness T' in the whole region to which the film forming method according to the present invention is applied falls within the range of 95% to 105% of a target value T2' defined by equation (3) below. In the arranging step of the second processing, even on the most projecting part plane of the substrate (that is, in the whole region of the substrate), the curable composition (A) can be arranged as a plurality of droplets on the substrate such that the average liquid film thickness T' falls within the range of 95% to 105% of the target value T1' defined by equation (3) below.

$$T2'(t) = (100/X)) * (100/(100 - Y)) * T \quad (3)$$

[Film Forming Apparatus]

Figure 9:
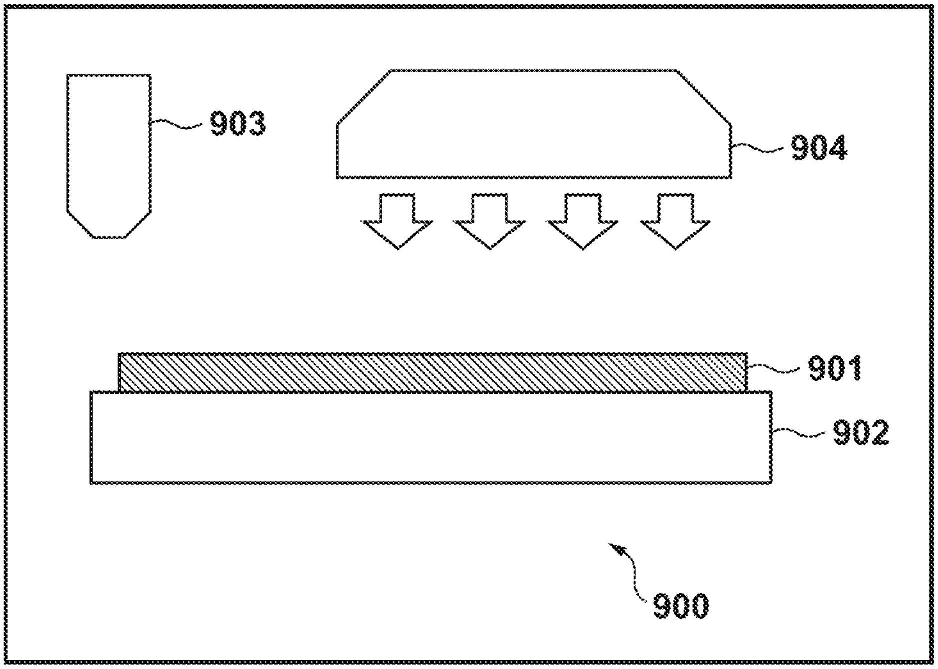
FIG. 9 is a view showing an example of the configuration of a film forming apparatus configured to execute the film forming method according to the present invention.

An example of the configuration of a film forming apparatus configured to execute the film forming method according to the present invention will be described. FIG. 9 is a view showing an example of the configuration of a film forming apparatus 900. The film forming apparatus 900 can include a substrate stage 902, a discharge unit (dispenser) 903, and a light irradiation unit 904. The substrate stage 902 is configured to hold a substrate 901 and drive the substrate 901 in a direction parallel to the surface of the substrate 901. In a state in which the substrate 901 is moved by the substrate stage 902 relative to the discharge unit 903, the discharge unit 903 discharges droplets of the curable composition (A) by an inkjet method, thereby arranging the curable composition (A) as a plurality of droplets on the substrate 901. In the curing step, the light irradiation unit 904 irradiates the liquid film of the curable composition (A) on the substrate 901 with light (for example, ultraviolet light) capable of curing the curable composition (A), thereby curing the liquid film. Thus, a cured film of the curable composition (A) can be formed on the substrate 901. Note that to cure the curable composition (A) by heating, a heating unit that heats the substrate 901 and the curable composition (A) thereon can be provided in place of the light irradiation unit 904.

[Article Manufacturing Method]

On the flat film formed by the film forming method according to the present invention, a known photolithography process such as imprint lithography or extreme ultraviolet lithography (EUV) can be performed. In addition, the photolithography process can be performed after a spin-on-glass (SOG) film and/or a silicon oxide layer is stacked, and a curable composition is applied thereto. Thus, an article (device) such as a semiconductor device can be manufactured. An apparatus including such an article (device), for example, an electronic apparatus such as a display, a camera, or a medical apparatus can also be formed.

Examples of the article (device) are an electric circuit element, an optical element, MEMS, a recording element, a sensor, and a mold. Examples of the electric circuit element are volatile or nonvolatile semiconductor memories such as a DRAM, an SRAM, a flash memory, and an MRAM, and semiconductor elements such as an LSI, a CCD, an image sensor, and an FPGA. Examples of the optical element are a micro lens, a light guide body, a waveguide, an antireflection film, a diffraction grating, a polarizer, a color filter, a light-emitting element, a display, and a solar battery. Examples of the MEMS are a DMD, a microchannel, and an electromechanical transducer. Examples of the recording element are optical disks such as a CD and a DVD, a magnetic disk, a magneto-optical disk, and a magnetic head. Examples of the sensor are a magnetic sensor, a photosensor, and a gyro sensor. An example of the mold is a mold for imprinting.

Examples

More practical examples will be explained below in order to supplement the above-described embodiments.

<Conditions for Obtaining Practically Continuous Liquid Film>

A plurality of droplets of 1 pL (picoliter) of a curable composition (A) having a surface tension of 33 mN/m and a viscosity of 30 mPa·s were dropped (arranged) in a square array at a predetermined interval on a flat substrate. A behavior that each droplet of the curable composition (A) spread on the substrate was calculated by numerical calculation (see NPL 2) based on Navier-Stokes equations that had undergone a thin-film approximation method (lubrication theory) with a free surface. The thickness of the liquid film at the center of a drop position (the thickest portion of the liquid film on the substrate) and the thickness of the liquid film at the center of a square formed by four droplets arrayed in a square (the thinnest portion of the liquid film on the substrate) after the elapse of 300 sec from the drop of the droplets of the curable composition (A) are shown in Table 1 below. "The center of a drop position" is, for example, a position $P_1$ shown in FIG. 4C, and "the center of a square formed by four droplets arrayed in a square" is, for example, a position $P_2$ shown in FIG. 4C. Note that assume that the contact angle of a droplet of the curable composition (A) with respect to the substrate is 0°, and volatilization of a solvent (d) during 300 sec from the drop of the droplets of the curable composition (A) can be neglected.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| droplet pitch (μm) | 63 | 70 | 81 | 84 | 88 | 91 | 95 | 100 |
| average thickness (nm) | 252 | 204 | 153 | 142 | 130 | 120 | 111 | 100 |
| thickness of thickest portion (nm) | 252 | 204 | 153 | 145 | 160 | 164 | 170 | 180 |
| thickness of thinnest portion (nm) | 252 | 204 | 153 | 138 | 84 | 0 | 0 | 0 |

In Table 1, results in which a condition that the average film thickness is 142 nm or more was satisfied are shown as examples, and results in which the condition was not satisfied are shown as comparative examples. Referring to Table, 1, in Examples 1 to 4 in which the average film thickness was 142 nm or more, a flat liquid film in which the difference (height difference) between the thickness of the thickest portion and the thickness of the thinnest portion was 8 nm or less was formed.

<Examination of Controllability of Average Film Thickness>

In the region to which the film forming method according to the present invention is applied, both the droplet volume and the square array pitch can be changed, but the liquid film thickness before volatilization of the solvent (d) is 142 nm, as described above, even in the region with the minimum liquid film thickness. The thickness of the liquid film before curing (to be sometimes referred to as a thickness before curing hereinafter), which remains after volatilization of the solvent (d) from a state in which a liquid film whose height difference on the surface is 8 nm or less, is calculated. Assuming that the minimum value of the square array pitch of droplets dropped was 35 μm, the maximum value of the thickness before curing was calculated. The minimum value of the liquid film before volatilization of the solvent (d) with which a liquid film having a height difference of 8 nm or less can be obtained was calculated as 142 nm, as described above. For this reason, the minimum value of the thickness before curing can be calculated by main component concentration (vol %)×142 nm. Here, the main component concentration (vol %) is the concentration of components (that is, components (a) to (c)) other than the solvent (d) in the curable composition (A), and is a value obtained by subtracting vol % of the solvent (d) from 100 vol %. Cases where the droplet volumes are 1.0 pL and 3.0 pL are shown in Tables 2 and 3, respectively.

TABLE 2

| | Example 6 | Example 7 | Example 8 | Example 9 | Example 10 | Example 11 |
|---|---|---|---|---|---|---|
| main component concentration (vol %) | 5 | 10 | 15 | 20 | 25 | 30 |
| maximum film thickness (nm) | 41 | 82 | 122 | 163 | 205 | 245 |
| minimum film thickness (nm) | 7 | 14 | 21 | 28 | 36 | 43 |

TABLE 3

| | Example 6 | Example 7 | Example 8 | Example 9 | Example 10 | Example 11 |
|---|---|---|---|---|---|---|
| main component concentration (vol %) | 5 | 10 | 15 | 20 | 25 | 30 |
| maximum film thickness (nm) | 123 | 245 | 366 | 490 | 615 | 735 |
| minimum film thickness (nm) | 7 | 14 | 21 | 28 | 36 | 43 |

In the film forming method according to the present invention, a required film thickness is, for example, 30 nm or more and 200 nm or less. As shown in Tables 2 and 3, if the main component concentration is 10 vol % or more, a thick film having a thickness of 200 nm or more can be obtained. If the main component concentration is 20 vol % or less, a thin film having a thickness of 30 nm can be formed. From this, it can be said that it is particularly preferable that the main component concentration of the curable composition (A) is 10 vol % or more and 20 vol % or less, that is, the content of the solvent (d) is 80 vol % or more and 90 vol % or less.

<Theoretical Calculation of Planarization Behavior>

As one of the embodiments of the present invention, as described above, the average liquid film thickness T' in the region whose average height is lower by t (nm) than the substrate surface can be defined by $$T'(t)=(100/X)*(100/(100-Y))*(T+t) \quad (1)$$

In the liquid film having the thickness T'(t) in the early time, the liquid film thickness changes to X/100 times due to volatilization of the solvent (d), and the liquid film thickness changes to (100−Y)/100 times due to curing shrinkage. Hence, the thickness of the cured film in the region whose average height is lower only by t (nm) than the most projecting part plane (for example, the most projecting region) is (T+t). Hence, it is obvious that in the region where the average height is constant, a flat cured film having the thickness T (nm) using the surface of the most projecting part plane (for example, the most projecting region) as the reference surface can be obtained.

In a region (boundary portion) at the boundary where the average height changes, it is difficult to do simplification as described above. For this reason, a behavior that a practically continuous liquid film in the waiting step is volatilized and planarized is calculated by numerical calculation, thereby showing that a flat cured film is obtained. In the numerical calculation, based on Navier-Stokes equations (see NPL 2) that had undergone a thin-film approximation method (lubrication theory) with a free surface, a decrease by volatilization was added as a source term, and calculation was performed. Assuming that volatilization is proportional to the divided pressure of the volatile component, and the divided pressure was obtained by the Raoult's law. In addition, since the concentration distribution of the composition was uneven due to volatilization, and the concentration diffusion occurred, these were also taken into consideration.

Figure 6:
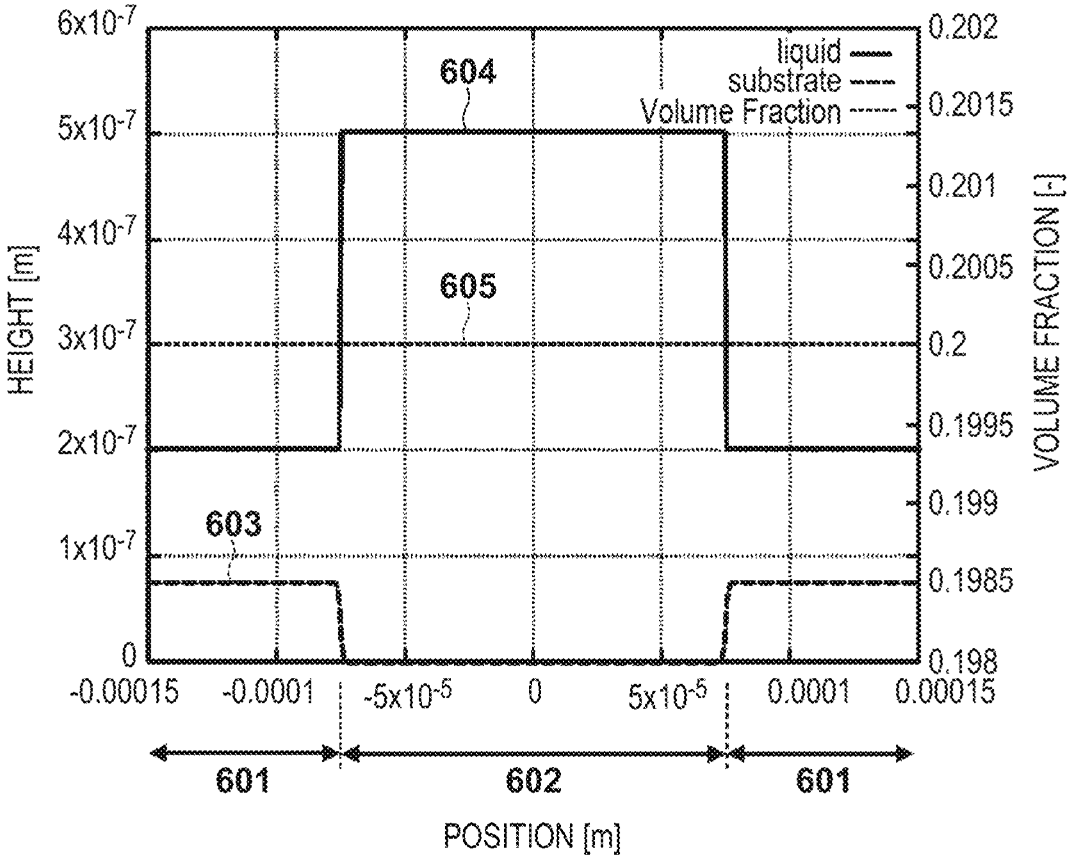
FIG. 6 is a view showing a calculation result (before a waiting step) of the film forming method according to the present invention.

FIG. 6 shows the initial shape of numerical calculation. In this example, the substrate is assumed to have a structure in which a region (most projecting part plane) of the reference surface and a region whose average height is lower by t=75 nm than the reference surface are repeated at a period of 300 μm. A region indicated by a reference numeral 601 in FIG. 6 is the region (most projecting part plane) of the reference surface, and a region indicated by reference numeral 602 in FIG. 6 is the region whose average height is lower by 75 nm than the reference surface. Reference numeral 603 in FIG. 6 indicates the height (first ordinate) of the substrate surface. Note that in FIG. 6, the region 602 is indicated on a coordinate system with a height of 0. Droplets of the curable composition (A) having a composition of X=20 and Y=0 are arranged on the substrate. These combine each other to form a practically continuous liquid film. The formed liquid film is approximated as 604 in FIG. 6. This example aims at forming a cured film having a thickness of 25 nm in the region 601, forming a cured film having a thickness of 100 nm in the region 602, and forming a flat cured film in consideration of a step difference of 75 nm. Hence, based on equation (1) above, a practically continuous liquid film having a thickness of 125 nm is formed in the region 601, and a practically continuous liquid film having a thickness of 500 nm is formed in the region 602. Reference numeral 604 in FIG. 6 indicates that a liquid film having such a thickness is formed. Reference numeral 605 in FIG. 6 indicates a chart showing a volume fraction c (second ordinate) of a non-volatile component. Since X=20 in the initial state, c=0.2.

For the initial shape shown in FIG. 6, calculation was executed using the above-described numerical calculation method. Note that the surface tension was 0.033 $J/m^2$, and the mass density was 1,000 $kg/m^3$. The viscosity coefficients were $\mu(c)=\mu_0\exp(M\mu(c-c\mu_0))$, $\mu_0=0.03$ Pa·s, $M_\mu=2.012$, and $c_\mu 0=0.2$. The diffusion coefficients of the nonvolatile component were $D(c)=D_0\exp(M_D(c-c_{D0}))$, $M_D=-1.23$, and $c_{D0}=0.2$. Note that as for a diffusion coefficient Do and a volatilization proportionality coefficient $E_0$, results are shown while changing several parameters.

Figure 7:
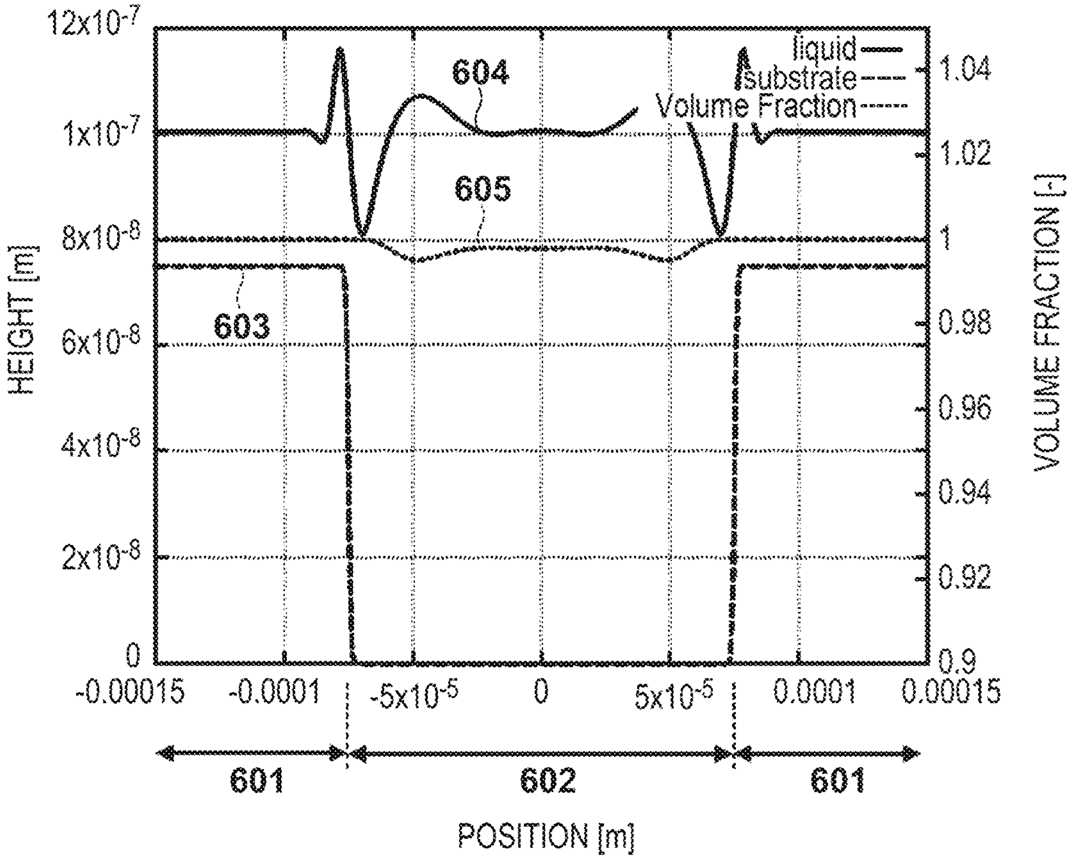
FIG. 7 is a view showing a calculation result (immediately after volatilization completion) of the film forming method according to the present invention.

FIG. 7 shows the shape immediately after completion of volatilization of the solvent (d). In this calculation, $D_0=3.43\times10^{-12}$ $m^2/s$, $E_0=1.0\times10^{-6}$ m/s. Referring to the volume fraction 605 (second ordinate), this substantially reaches 1, and it is found that volatilization is ended. Also, referring to the liquid film 604, it is found that, although the liquid film shrinks to near a height of 100 nm due to volatilization and substantially becomes flat, unevenness of about 35 nm is caused near the boundary of the step difference of the substrate by shrinkage due to volatilization and relaxation due to flowing.

Figure 8:
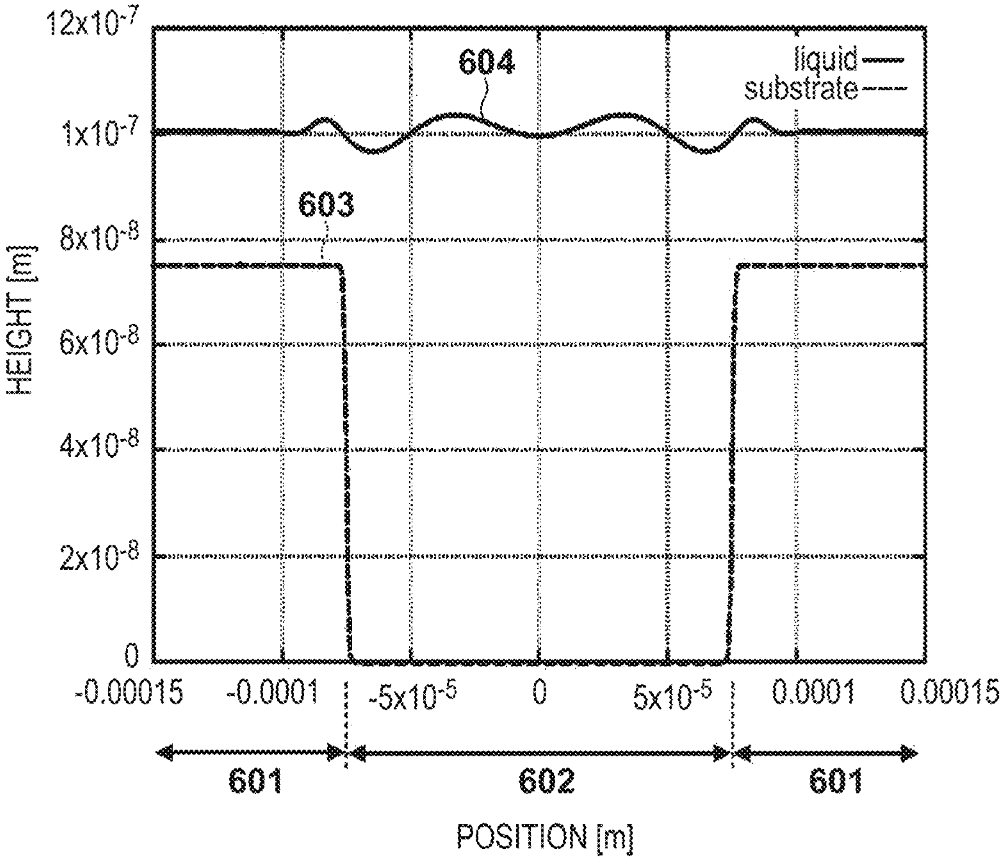
FIG. 8 is a view showing a calculation result (after the waiting step) of the film forming method according to the present invention.

Since the nonvolatile component remaining after the completion of volatilization of the solvent (d) is a liquid, flowing is continued, and the unevenness is relaxed. In this example, assuming a decrease of viscosity due to heating, flowing calculation was continuously executed by setting $\mu(c)=0.03$ Pa·s. FIG. 8 shows the shape after flowing for 20 sec. Referring to the liquid film 604, it is found that the unevenness of the liquid film is relaxed, and a flat film in which the height difference between a concave portion and a convex portion is 8 nm or less can be formed.

The above-described calculation was executed for various coefficients Do and $E_0$. Table 4 shows the result. As shown in Table 4, it is found that for many combinations of $D_0$ and $E_0$, a flat cured film having a height difference of 8 nm or less can be obtained in 20 to 650 sec even for the region at the boundary where the average height changes. For example, it is found that the diffusion coefficients Do is preferably lower, and preferably $3.43\times10^{-11}$ $m^2/s$ or less. Also, it is found that the volatilization proportionality coefficient $E_0$ is preferably higher, and preferably $1.0\times10^{-7}$ m/s or more.

TABLE 4

| Volatilization proportionality coefficient $E_0$ [m/sec] | Diffusion coefficients $D_0$ [$m^2$/sec] | Seconds needed to achieve height difference of 8 nm or less [sec] |
|---|---|---|
| $1.0\times10^{-7}$ | $3.43\times10^{-11}$ | 650 |
| $1.0\times10^{-7}$ | $3.43\times10^{-12}$ | 300 |
| $1.0\times10^{-7}$ | $3.43\times10^{-13}$ | 300 |
| $1.0\times10^{-6}$ | $3.43\times10^{-12}$ | 20 |

<Evaluation of Curable Composition>

AS shown in Tables 5, 6, and 7 below, a component (a), a component (b), and a component (c) were mixed such that 100 wt % was obtained in total. Next, a solvent (a component (d)) of (100−X) vol % was added to the mixture of the component (a), the component (b), and the component (c) of Z vol %, thereby obtaining a curable composition (A) of 100 vol % in total. Under a condition that the thickness of a liquid film before volatilization of the a solvent (a component (d)) became 130 nm, the curable composition (A) was discretely dropped (arranged) on a silicon substrate and left stand for 300 sec at 23° C. as the waiting step. If the component (a) volatilizes during the waiting step, it is determined as poor volatility (x). If the droplets of the curable composition (A) did not sufficiently spread due to volatilization of the component (d) or the like during the waiting step, and a practically continuous liquid film was not formed, t is determined as poor flatness (x). If a practically continuous liquid film was formed, and volatilization of the component (a) did not occur, it is determined as excellent flatness (O). Tables 5, 6, and 7 show the volatilities and flatnesses of various kinds of curable compositions (A) together. Also, abbreviations in Tables 5, 6, and 7 are as follows.

a1: 1,3-cyclohexanedimethanol diacrylate (boiling point=310° C.)
a2: m-xylylene diacrylate (boiling point=336° C.)
a3: 1,4-cyclohexanedimethanol diacrylate (boiling point=339° C.)
a4: 2-phenyl-1,3-propan diol diacrylate (boiling point=340° C.)
a5: tricyclodecanedimethanol diacrylate (boiling point=342° C.)
a6: 1-phenylethane-1,2-diyl diacrylate (boiling point=354° C.)
a7: 3-phenoxybenzyl acrylate (boiling point=367° C.)
a8: 4-hexylresolsinol diacrylate (boiling point=379° C.)
a9: 6-phenylhexane-1,2-diol diacrylate (boiling point=381° C.)
a10: 7-phenylheptan-1,2-diol diacrylate (boiling point=393° C.)
a11: 1,3-bis((2-hydroxyethoxy)methyl)cyclohexane diacrylate (boiling point=403° C.)
a12: 8-phenyloctane-1,2-diol diacrylate (boiling point=404° C.)
a13: 1,3-bis((2-hydroxyethoxy)methyl)benzene diacrylate (boiling point=408° C.)
a14: 1,4-bis((2-hydroxyethoxy)methyl)cyclohexane diacrylate (boiling point=445° C.)
a15: 1-naphthyl acrylate (boiling point=317° C.)
a16: 2-naphthylmethyl acrylate (boiling point=342° C.)
a17: cyanobenzyl acrylate (boiling point=316° C.)
a18: 2-phenylphenoxyethyl acrylate (boiling point=364° C.)
ac1: isobornyl acrylate (boiling point=245° C.)
b1: bis(2,4,6-trimethylbenzoyl)phenylphosphine oxide
d1: propylene glycol monomethyl ether acetate (boiling point=146° C.)
d2: benzyl acrylate (boiling point=229° C.)
dc1: acetone (boiling point=56° C.)
dc2: methyl nonafluorobutyl ether (boiling point=60° C.)

TABLE 5

| | Comparative Example 4 | Comparative Example 5 | Comparative Example 6 | Example 12 | Example 13 | Example 14 | Example 15 | Example 16 |
|---|---|---|---|---|---|---|---|---|
| component (a)/wt % | ac1/95 | a17/95 | ← | a1/95 | a2/95 | a3/95 | a4/95 | a5/95 |
| component (b)/wt % | b1/5 | ← | ← | ← | ← | ← | ← | ← |
| component (c)/wt % | N/A | ← | ← | ← | ← | ← | ← | ← |
| total vol % of components (a) to (c) | 20 | ← | ← | ← | ← | ← | ← | ← |
| component (d)/vol % | d1/80 | dc1/80 | dc2/80 | d1/80 | ← | ← | ← | ← |
| volatility | x | ○ | ○ | ○ | ○ | ○ | ○ | ○ |
| flatness | ○ | x | x | ○ | ○ | ○ | ○ | ○ |

TABLE 6

| | Example 17 | Example 18 | Example 19 | Example 20 | Example 21 | Example 22 | Example 23 | Example 24 |
|---|---|---|---|---|---|---|---|---|
| component (a)/wt % | a6/95 | a7/95 | a8/95 | a9/95 | a10/95 | a11/95 | a12/95 | a13/95 |
| component (b)/wt % | b1/5 | ← | ← | ← | ← | ← | ← | ← |
| component (c)/wt % | N/A | ← | ← | ← | ← | ← | ← | ← |
| total vol % of components (a) to (c) | 20 | ← | ← | ← | ← | ← | ← | ← |
| component (d)/vol % | d1/80 | ← | ← | ← | ← | ← | ← | ← |
| volatility | ○ | ○ | ○ | ○ | ○ | ○ | ○ | ○ |
| flatness | ○ | ○ | ○ | ○ | ○ | ○ | ○ | ○ |

TABLE 7

| | Example 25 | Example 26 | Example 27 | Example 28 | Example 29 |
|---|---|---|---|---|---|
| component (a)/wt % | a14/95 | a15/95 | a16/95 | a17/95 | a18/95 |
| component (b)/wt % | b1/5 | ← | ← | ← | ← |
| component (c)/wt % | N/A | ← | ← | ← | ← |
| total vol % of components (a) to (c) | 20 | ← | ← | ← | ← |
| component (d)/vol % | d1/80 | ← | ← | ← | ← |
| volatility | ○ | ○ | ○ | ○ | ○ |
| flatness | ○ | ○ | ○ | ○ | ○ |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A film forming method comprising:

discretely arranging, on a substrate with unevenness, a plurality of droplets of a curable composition in a liquid form containing at least a polymerizable compound (a) as a nonvolatile component and at least a solvent (d) as a volatile component;

waiting until each of the plurality of droplets discretely arranged on the substrate combines with an adjacent droplet to form a continuous liquid film on the substrate, and the solvent (d) contained in the liquid film volatilizes, and a content of the solvent (d) becomes not more than 10 vol % with respect to the whole liquid film; and curing the curable composition in the liquid form after the waiting, wherein the substrate includes a plurality of regions having different average heights, in the arranging, the curable composition is arranged such that an average liquid film thickness of the curable composition arranged in a certain region is larger by an offset amount than the average liquid film thickness of the curable composition arranged in a most projecting part region of the substrate, and the offset amount is determined in accordance with the content of the solvent (d) that volatizes in the waiting, and a curing shrinkage rate of the curable composition.

2. The film forming method according to claim 1, wherein the content of the solvent (d) in the curable composition is not more than 1 wt %.

3. The film forming method according to claim 1, wherein the waiting is performed while heating the substrate under conditions that a temperature is not less than 30° C. and not more than 200° C., and time is not less than 10 sec and not more than 3,000 sec.

4. The film forming method according to claim 1, wherein in a case where a most projecting part plane is defined as a reference surface, letting T be a target thickness of the cured film of the curable composition, which should be formed on the most projecting part region in the curing, T' be an average liquid film thickness assumed from a volume and the number of droplets of the curable composition arranged on the substrate in the arranging, Y % be a curing shrinkage rate of the curable composition in the curing, and X vol % be a concentration of the nonvolatile component in the curable composition in the arranging, a target value T'(t) of the average liquid film thickness in a region whose average height is lower by t (nm) than the reference surface is defined by $$T'(t)=(100/X)*(100/(100-Y))*(T+t),$$

in the arranging, the plurality of droplets are arranged on the substrate such that the average liquid film thickness in the region whose average height is lower by t (nm) than the reference surface falls within a range of 95% to 105% of the target value T'(t).

5. The film forming method according to claim 1, wherein the film forming method is performed divisionally by a plurality of times of processing, and each of the plurality of times of processing includes the arranging, the waiting, and the curing.

6. The film forming method according to claim 1, wherein the film forming method is performed divisionally by a plurality of times of processing including first processing and second processing, each of the first processing and the second processing includes the arranging, the waiting, and the curing, in a case where a most projecting part plane of the substrate is defined as a reference surface (average height=0 (nm)), letting T be a target thickness of the cured film of the curable composition, which should be formed on the most projecting part plane in the curing, T' be an average liquid film thickness assumed from a volume and the number of droplets of the curable composition arranged on the substrate in the arranging, Y % be a curing shrinkage rate of the curable composition in the curing, and X vol % be a concentration of the nonvolatile component in the curable composition in the arranging, in the arranging of the first processing, the plurality of droplets are arranged on the substrate such that the average liquid film thickness in the region whose average height is lower by t (nm) than the reference surface falls within a range of 95% to 105% of a target value $T_1'$ defined by $$T_1'=(100/X)*(100/(100-Y))*t,$$

in the arranging of the second processing, the plurality of droplets are arranged on the substrate such that the average liquid film thickness in a whole region where the film forming method is executed falls within a range of 95% to 105% of a target value $T_2'$ defined by $$T_2'=(100/X)*(100/(100-Y))*T.$$

7. The film forming method according to claim 1, wherein in the arranging, the plurality of droplets are arranged on the substrate such that the average liquid film thickness assumed from the volume and the number of droplets of the curable composition arranged on the substrate is not less than 142 nm.

8. The film forming method according to claim 1, wherein in the arranging, the plurality of droplets are discretely arranged on the substrate using an inkjet method.

9. The film forming method according to claim 1, wherein the curable composition when arranged as the plurality of droplets on the substrate in the arranging contains at least the polymerizable compound (a), a photopolymerization initiator (b), and the solvent (d), the polymerizable compound (a) contains at least a compound having one of an aromatic structure, an aromatic heterocyclic structure, and an alicyclic structure, the curable composition has a viscosity of not less than 1.3 mPa·s and not more than 60 mPa·s at 23° C., in a state in which the solvent is removed, the curable composition has a viscosity of not less than 30 mPa·s and not more than 10,000 mPa·s, and the content of the solvent is not less than 70 vol % and not less than 95 vol % with respect to the whole curable composition.

10. The film forming method according to claim 9, characterized in that the solvent (d) contains not less than one type of solvent, and a boiling point of each of the not less than one type of solvent at normal pressure is not less than 80° C. and less than 250° C.

11. The film forming method according to claim 9, characterized in that the solvent contains a polymerizable compound whose boiling point at normal pressure is not less than 80° C. and less than 250° C.

12. The film forming method according to claim 9, characterized in that as the polymerizable compound, at least a polymer having a polymerizable functional group is contained.

* * * * *